(12) United States Patent  
Iguchi et al.

(10) Patent No.: US 8,890,883 B2  
(45) Date of Patent: Nov. 18, 2014

(54) DECOLORING APPARATUS, CONTROLLING APPARATUS, METHOD FOR DISPLAYING

(75) Inventors: Ken Iguchi, Shizuoka-ken (JP); Hiroyuki Taki, Shizuoka-ken (JP); Takahiro Kawaguchi, Shizuoka-ken (JP); Isao Yahata, Shizuoka-ken (JP); Hiroyuki Taguchi, Shizuoka-ken (JP); Hiroyuki Tsuchihashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 759 days.

(21) Appl. No.: 13/069,307

(22) Filed: Mar. 22, 2011

(65) Prior Publication Data

US 2011/0236843 A1 Sep. 29, 2011

Related U.S. Application Data

(60) Provisional application No. 61/317,222, filed on Mar. 24, 2010, provisional application No. 61/317,216, filed on Mar. 24, 2010, provisional application No. 61/317,211, filed on Mar. 24, 2010.

(51) Int. Cl.
*G09G 5/00* (2006.01)
(Continued)

(52) U.S. Cl.
CPC .............. *H04N 1/23* (2013.01); *H04N 1/2392* (2013.01); *H04N 1/00716* (2013.01);
(Continued)

(58) Field of Classification Search
USPC ............ 345/589, 606, 204, 690, 207, 10, 12, 345/20; 358/1.1, 1.9, 3.32, 501–502, 527; 271/3.01, 3.12, 3.18, 3.19, 225–227, 271/278, 282–288, 212, 306, 207; 399/91, 399/107, 112, 121, 124, 130, 144; 34/94, 34/105; 382/162, 163
See application file for complete search history.

(56) References Cited

U.S. PATENT DOCUMENTS 5,572,311 A 11/1996 Abe et al.
5,612,766 A 3/1997 Iida et al.
(Continued)

FOREIGN PATENT DOCUMENTS

JP H05-289575 A 11/1993
JP 2005-088506 A 4/2005
(Continued)

OTHER PUBLICATIONS

Search Report mailed Jul. 6, 2011, in European counterpart Application No. 11158956.0-1228, 4 pages.
(Continued)

*Primary Examiner* — Wesner Sajous
(74) *Attorney, Agent, or Firm* — Patterson & Sheridan LLP

(57) ABSTRACT

According to one embodiment, an decoloring apparatus includes: an decoloring processing unit configured to apply decoloring processing decoloring a color of an decolorable colorant; a sheet conveying unit configured to convey the sheet and cause the sheet to pass through the decoloring processing unit; an image reading unit arranged further on an upstream side than the decoloring processing unit in a sheet conveying direction by the sheet conveying unit and configured to read the image formed on the sheet conveyed by the sheet conveying unit; a thickness sensor arranged further on the upstream side than the decoloring processing unit in the sheet conveying direction by the sheet conveying unit and configured to detect thickness of the sheet conveyed by the sheet conveying unit; an decolorability determining unit configured to determine, on the basis of a detection result in at least one of the image reading unit and the thickness sensor, executability of the decoloring processing in the decoloring processing unit of the sheet set as a detection target; a storing unit configured to store information indicating a number of sheets determined as decoloring processing unexecutable by the decolorability determining unit; and a display control unit configured to cause, when the apparatus is started, a display to screen-display the information stored in the storing unit indicating the number of sheets determined as decoloring processing unexecutable by the decolorability determining unit.

20 Claims, 26 Drawing Sheets

(51) Int. Cl.
*G09G 5/02* (2006.01)
*B65H 83/00* (2006.01)
*B65H 31/00* (2006.01)
*G06K 1/00* (2006.01)
*G06K 9/00* (2006.01)
*H04N 1/23* (2006.01)
*H04N 1/00* (2006.01)
*H04N 1/21* (2006.01)
*B41M 7/00* (2006.01)

(52) U.S. Cl.
CPC ........... *H04N 1/2376* (2013.01); *H04N 1/2323* (2013.01); *H04N 1/2162* (2013.01); *H04N 1/00567* (2013.01); *B41M 7/0009* (2013.01)
USPC ........... 345/589; 345/581; 345/606; 345/690; 271/3.18; 271/207; 358/1.9; 382/163

(56) References Cited

U.S. PATENT DOCUMENTS

| | | | | |
|---|---|---|---|---|
| 6,017,386 | A * | 1/2000 | Sano et al. | 106/31.32 |
| 6,277,208 | B1 * | 8/2001 | Sano et al. | 134/19 |
| 6,375,742 | B2 * | 4/2002 | Sano et al. | 118/600 |
| 7,856,202 | B2 | 12/2010 | Mizobuchi et al. | |
| 8,292,287 | B2 * | 10/2012 | Iguchi et al. | 271/9.08 |
| 8,526,037 | B2 | 9/2013 | Emori et al. | |
| 2006/0115283 | A1 | 6/2006 | Yamauchi et al. | |
| 2008/0008508 | A1 * | 1/2008 | Mizobuchi et al. | 399/389 |
| 2010/0008164 | A1 * | 1/2010 | Murayama et al. | 365/189.011 |
| 2010/0225047 | A1 * | 9/2010 | Yoshimura et al. | 271/9.07 |
| 2011/0221852 | A1 * | 9/2011 | Yahata et al. | 347/179 |
| 2011/0235075 | A1 | 9/2011 | Iguchi et al. | |
| 2013/0015623 | A1 * | 1/2013 | Iguchi et al. | 271/279 |

FOREIGN PATENT DOCUMENTS

| | | |
|---|---|---|
| JP | 2005-257995 A | 9/2005 |
| JP | 2008-015259 A | 1/2008 |
| JP | 2008-102783 A | 5/2008 |
| JP | 2010-027036 A | 2/2010 |

OTHER PUBLICATIONS

English translation of Japanese Office Action dated Sep. 3, 2013, filed in corresponding Japanese Patent Application No. 2011-064867.

Office Action dated Oct. 24, 2013, filed in Chinese counterpart Application No. 201110057800.3, with English translation.

\* cited by examiner

FIG.5

| DECOLORING PROCESSING ID | PROCESSING EXECUTION DAY | USER ID | DEPARTMENT | NUMBER OF DECOLORING PROCESSING EXECUTED SHEETS | NUMBER OF DECOLORING PROCESSING SUCCESSFUL SHEETS | NUMBER OF DECOLORING PROCESSING UNSUCCESSFUL SHEETS | | | |
|---|---|---|---|---|---|---|---|---|---|
| | | | | | | UNDECOLORED IMAGE REMAINS | BEND/TEAR | SHEETS ARE BUNDLED | OBJECT REMAINS ON SHEET |
| | | | | | | | | | |
| | | | | | | | | | |
| | | | | | | | | | |
| | | | | | | | | | |

FIG.6

| DECOLORING PROCESSING ID | TOTAL NUMBER OF ECOLORING UNSUCCESSFUL SHEETS | REUSE RATIO | IMPROVEMENT CONTENT GUIDANCE ID | ENVIRONMENTAL LOAD CONTRIBUTION RATIO |
|---|---|---|---|---|
| | | | | |
| | | | | |
| | | | | |
| | | | | |
| | | | | |
| | | | | |

FIG.7

| PERIOD | NUMBER OF IN-PERIOD PRINTED SHEETS | NUMBER OF IN-PERIOD DECOLORING PROCESSING EXECUTED SHEETS | NUMBER OF IN-PERIOD DECOLORING PROCESSING SUCCESSFUL SHEETS |
|---|---|---|---|
| | | | |
| | | | |
| | | | |
| | | | |
| | | | |
| | | | |
| | | | |
| | | | |
| | | | |

DECOLORING APPARATUS, CONTROLLING APPARATUS, METHOD FOR DISPLAYING

CROSS-REFERENCE TO RELATED APPLICATION(S)

This application is based upon and claims the benefit of priority from: U.S. provisional application 61/317,222, filed on Mar. 24, 2010; U.S. provisional application 61/317,216, filed on Mar. 24, 2010; U.S. provisional application No. 61/317,211, filed on Mar. 24, 2010; the entire contents all of which are incorporated herein by reference.

FIELD

Embodiments described herein relate generally to an information display technique in an decoloring apparatus that decolors a color of an image formed with an decolorable colorant.

BACKGROUND

In the past, an decoloring apparatus has been known that applies heating processing to a sheet, on which an image is formed with a so-called decolorable colorant, to decolor a color of the image on the sheet and makes the sheet reusable.

An decoloring apparatus has also been known that determines whether various sheets to be subjected to decoloring processing are decolorable and determines whether the decoloring processing is successful.

In the decoloring processing in the decoloring apparatus, in some case, the decoloring processing cannot be executed or cannot be sufficiently performed because there is a tear or a bend in a sheet to be subjected to the decoloring processing or a stapled bundle of sheets is directly set.

When a viewpoint of a reduction in an environmental load is taken into account, it is important to grasp information concerning a processing state of the decoloring processing in the decoloring apparatus. However, in a user interface screen in the past, it is difficult to grasp such information.

DESCRIPTION OF THE DRAWINGS

FIG. 5 is a diagram of an example of a data table of logs of various kinds of processing accumulated in a HDD 804;

FIG. 6 is a diagram of an example of the data table of logs of various kinds of processing accumulated in the HDD 804;

FIG. 7 is a diagram of an example of the data table of logs of various kinds of processing accumulated in the HDD 804;

DETAILED DESCRIPTION

In general, according to one embodiment, act a decoloring apparatus includes a sheet, a decoloring unit, a contribution-ratio calculating unit, and a display control unit. The sheet conveying unit is configured to convey a sheet. The decoloring unit is configured to decolor a color of an image formed with a decolorable colorant on the sheet conveyed by the sheet conveying unit. The contribution-ratio calculating unit is configured to calculate a number of sheets subjected to the decoloring processing by the decoloring unit and an environmental load contribution ratio calculated by multiplying the number of sheets subjected to the decoloring processing with a specified coefficient. The display control unit is configured to cause a display unit to display the environmental load contribution ratio calculated by the contribution-ratio calculating unit.

Embodiments are explained below with reference to the accompanying drawings.

First Embodiment

First, a first embodiment is explained.

Figure 1:
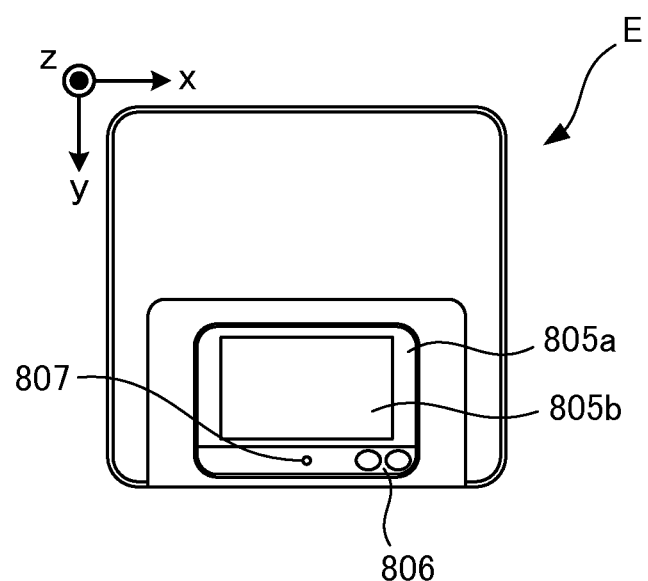
FIG. 1 is a plan view of an external appearance of an decoloring apparatus E according to a first embodiment viewed from above.
Figure 2:
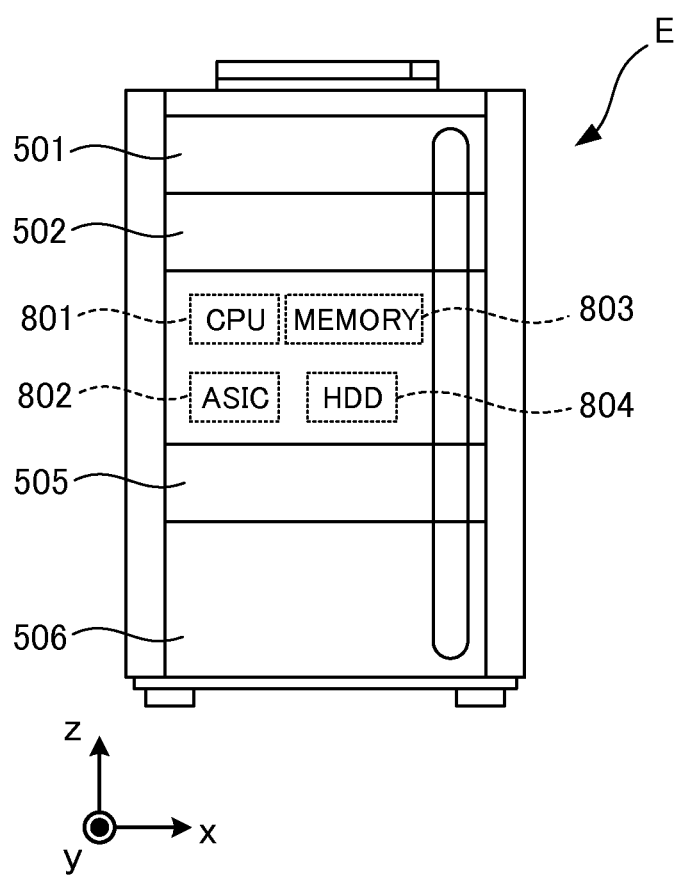
FIG. 2 is a front view of the external appearance of the decoloring apparatus E according to the first embodiment viewed from the front.

FIG. 1 is a plan view of the external appearance of an decoloring apparatus E according to the first embodiment viewed from above. FIG. 2 is a front view of the external appearance of the decoloring apparatus E according to the first embodiment viewed from the front.

The decoloring apparatus E subjects a sheet on which an image is formed with an "decolorable colorant" such as a so-called decolorable toner or decolorable ink to "decoloring processing" for decoloring a color of the decolorable colorant.

As shown in FIGS. 1 and 2, the decoloring apparatus E according to the first embodiment includes a processor 801, an ASIC (Application Specific Integrated Circuit) 802, a memory 803 (equivalent to a storing unit), a HDD (Hard Disk Drive) 804 (equivalent to a storing unit), a display unit 805a, a touch panel-type operation unit 805b (equivalent to an operation input unit), a button-type operation unit 806 (equivalent to an operation input unit), an IC card reader 807, feeding cassettes 505 and 506, discharge cassettes 501 and 502, and a reject box 509.

The display unit 805a can include, for example, an electronic paper, an LCD (Liquid Crystal Display), an EL (Electronic Luminescence), a PDP (Plasma Display Panel), or a CRT (Cathode Ray Tube).

The display unit 805a and the touch panel-type operation unit 805b cooperate with each other, whereby a so-called touch panel display is realized.

In the decoloring apparatus E according to this embodiment, the processor 801 has a role of performing various kinds of processing in the decoloring apparatus E. The processor 801 also has a role of realizing various functions by executing computer programs stored in the memory 803, the HDD 804, and the like. It goes without saying that the processor 801 can also be realized by a CPU (Central Processing Unit) or an MPU (Micro Processing Unit) that can execute equivalent arithmetic processing. Similarly, the HDD 804 can be replaced with a storage device such as a flash memory.

The memory 803 can include, for example, a RAM (Random Access Memory), a ROM (Read Only Memory), a DRAM (Dynamic Random Access Memory), an SRAM (Static Random Access Memory), a VRAM (Video RAM), or a flash memory. The memory 803 has a role of storing various kinds of information and computer programs used in the decoloring apparatus E.

The IC card reader 807 reads ID information of a user from an IC card carried by the user. The processor 801 performs personal authentication processing on the basis of the ID information read by the IC card reader 807.

The processor 801 and the ASIC 802 can perform information transmission and reception with external apparatuses such as a network server and an image forming apparatus (MFP: Multi Function Peripheral) through, for example, a LAN line.

An internal configuration of the decoloring apparatus E is explained in detail below.

Figure 3:
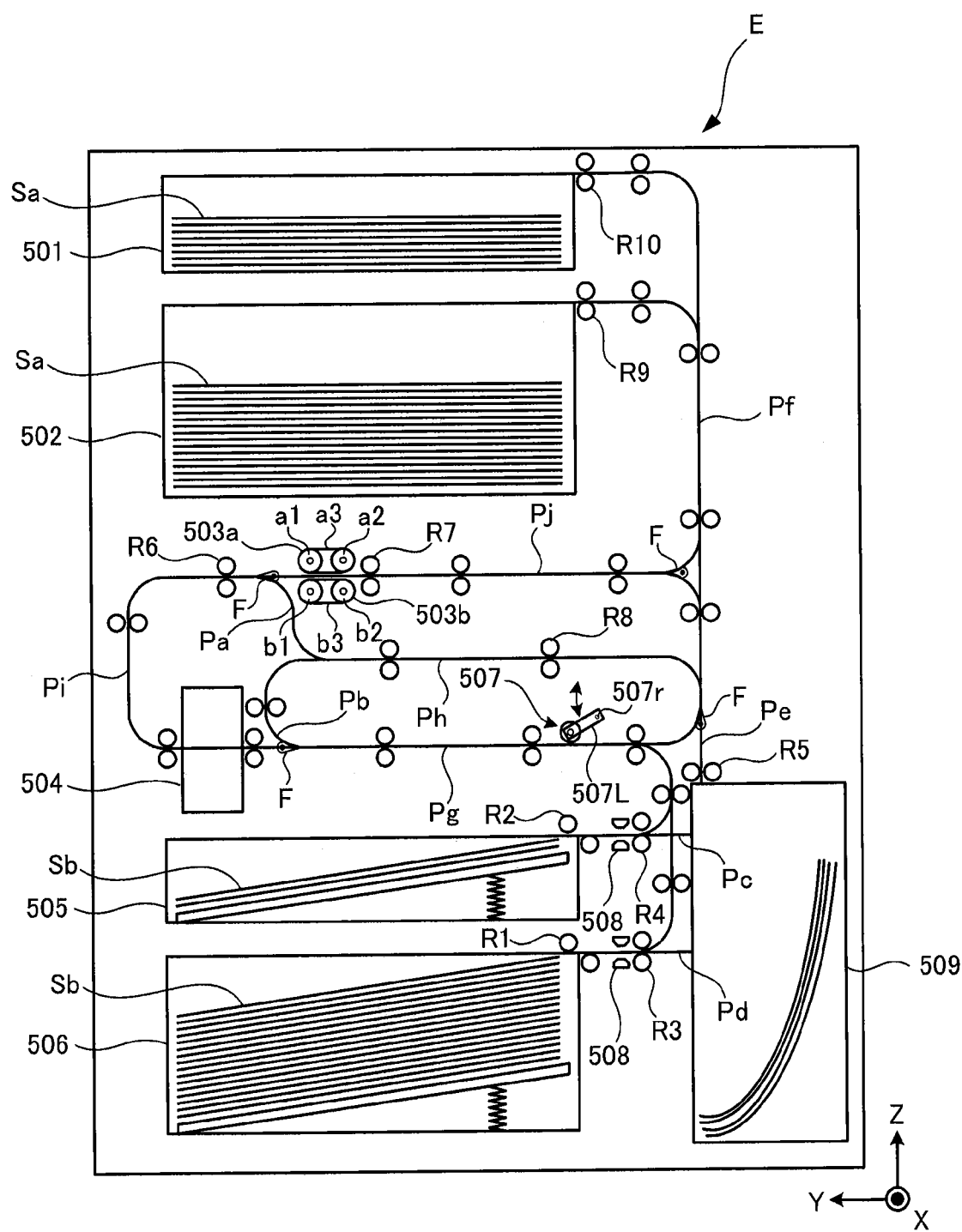
FIG. 3 is a longitudinal sectional view of an internal configuration of the decoloring apparatus E according to the first embodiment.
Figure 4:
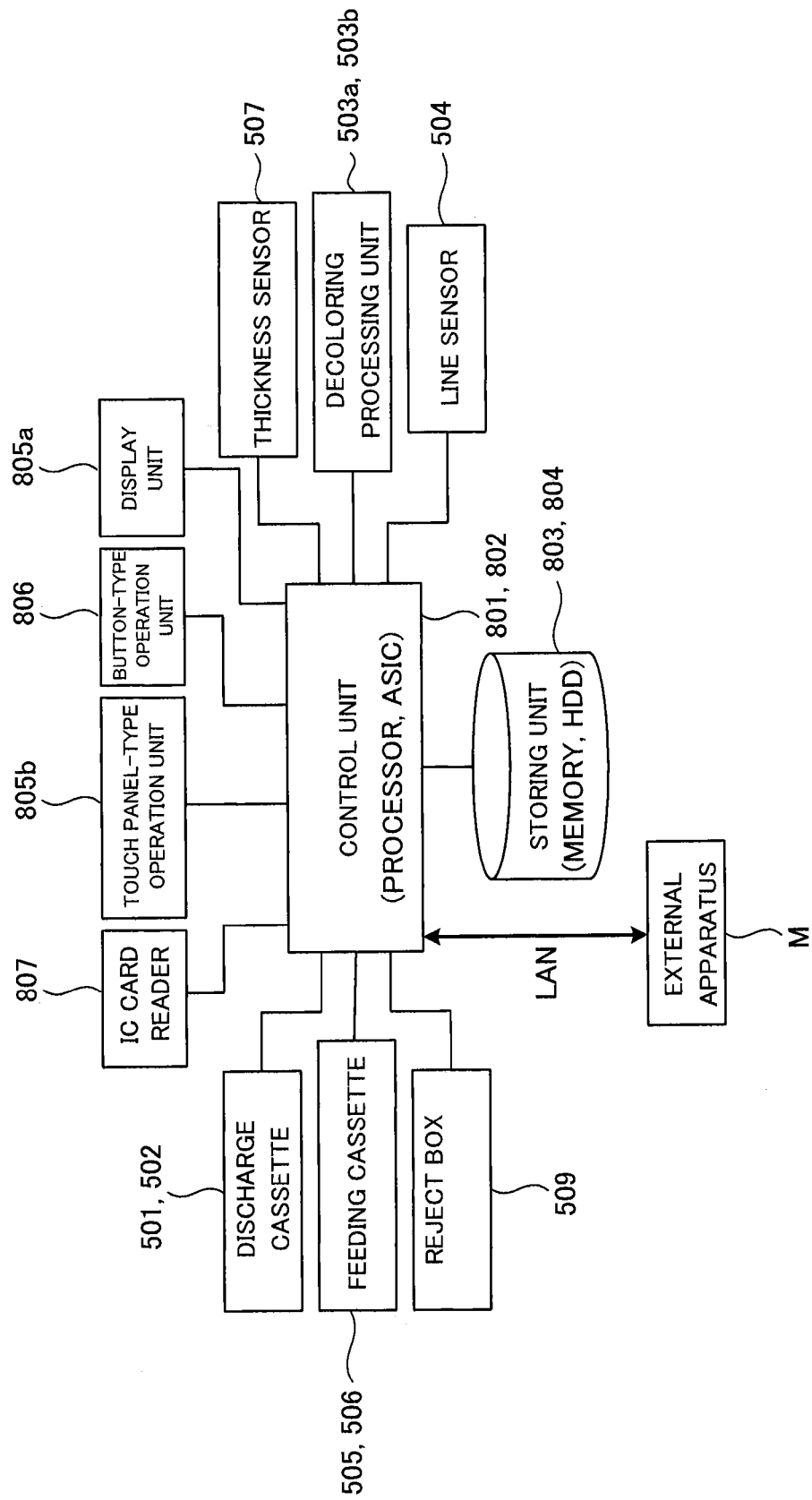
FIG. 4 is a block diagram of a functional configuration of the decoloring apparatus E according to the first embodiment.

FIG. 3 is a longitudinal sectional view of the internal configuration of the decoloring apparatus E according to the first embodiment. FIG. 4 is a block diagram of a functional configuration of the decoloring apparatus E according to the first embodiment.

The decoloring apparatus E includes, for example, the feeding cassettes 505 and 506 configured to stack and store sheets having images formed thereon to be subjected to decoloring processing, the discharge cassettes 501 and 502 configured to store the sheets subjected to the decoloring processing in the decoloring apparatus E, the reject box 509 (equivalent to a disposal sheet storing unit) configured to store un-reusable sheets, a lever-type thickness sensor 507 configured to detect the thickness of a conveyed sheet, double feed sensors 508 configured to detect double feed of sheets fed from the feeding cassettes 505 and 506, an optical line sensor 504 for detecting a printing state (including luminance, soil, stain, crease, and color) of an image formed on a surface of the conveyed sheet, decoloring processing units 503a and 503b configured to heat and decolor the image formed with an decolorable colorant on the sheet, conveying paths Pa to Pj and the like for leading a conveyance target sheet in a predetermined sheet conveying direction, conveying rollers R3 to R8 configured to convey the sheet through the conveying paths Pa to Pj and the like, sheet feeding rollers R1 and R2 configured to feed the sheets from the feeding cassettes 505 and 506 to the conveying paths, discharge rollers R9 and R10 configured to discharge the sheets subjected to the decoloring processing to the discharge cassettes 501 and 502, and flappers F provided at branch points of the conveying paths.

The conveying paths Pa to Pj and the like and the conveying rollers R3 to R8 and the like are equivalent to a "sheet conveying unit". The conveying rollers R1 to R10 are controlled to be driven by the processor 801. Conveying directions of a sheet conveyed by the sheet conveying unit are regulated by the flappers F controlled by the processor 801.

The sheet conveying unit includes the conveying paths Pc, Pd, and Pe serving as a "disposal sheet conveying path" for conveying a sheet passed through the line sensor 504 (an image reading unit) in the sheet conveying direction to the reject box 509 configured to store un-reusable sheets.

The line sensor 504 and the processor 801 cooperate with each other to realize a function of the "image reading unit".

The line sensor 504 is arranged further on the upstream side in the sheet conveying direction than the decoloring processing units 503a and 503b and scans an image formed on the sheet conveyed by the sheet conveying unit. The processor 801 detects, on the basis of image data read from the sheet by the line sensor 504, a printing ratio, printing density, a printing color (equivalent to printing state information), and the like of the image formed on the sheet.

The line sensor 504 can read, concerning both sides of the sheet, the printing ratio, the printing density, the printing color, and the like as the "printing state information".

The thickness sensor 507 and the processor 801 cooperate with each other to realize a function of a "sheet-thickness detecting unit". The thickness sensor 507 is arranged further on the upstream side than the decoloring processing units 503a and 503b in the sheet conveying direction by the sheet conveying unit. The thickness sensor 507 includes a lever member 507L that can rotate with a rotating shaft 507r as a fulcrum. The lever member 507L is urged by an elastic member such as a spring in a counterclockwise direction in FIG. 2 with the rotating shaft 507r as a fulcrum. The thickness sensor 507 detects a rotation angle of the lever member 507L, which retracts according to the thickness of a sheet passing near the thickness sensor 507 in the sheet conveying path, with an optical sensor or the like and obtains information concerning the thickness of the sheet.

The processor 801 is equivalent to a "processing control unit".

The decoloring processing unit 503*a* includes rollers a1 and a2 and a belt a3 wound and suspended around the rollers. The belt a3 also rotates according to rotation of the rollers. At least one of the rollers a1 and a2 is driven to rotate by the processor 801. At least one of the rollers a1 and a2 is heated by a heater controlled by the processor 801.

Similarly, the decoloring processing unit 503*b* includes rollers b1 and b2 and a belt b3 wound and suspended around the rollers. The belt b3 also rotates according to rotation of the rollers. At least one of the rollers b1 and b2 is driven to rotate by the processor 801. At least one of the rollers b1 and b2 is heated by the heater controlled by the processor 801.

The decoloring processing units 503*a* and 503*b* having the configuration explained above heat a sheet nipped and conveyed by the belts a3 and b3, the conveying rollers R6 and R7, and the like while conveying the sheet to thereby decolor an image of an decolorable colorant formed on the sheet.

The processor 801 (the processing control unit) controls control parameters for the decoloring processing by the decoloring processing units 503*a* and 503*b*, sheet conveying speed by the sheet conveying unit, and the like on the basis of the acquired printing state information.

Further, the processor 801 conveys the sheet subjected to the decoloring processing to the line sensor 504 through the conveying path Pj and the conveying path Pg to thereby cause the line sensor 504 to read images on both sides of the sheet subjected to the decoloring processing.

A basic operation of processing in the decoloring apparatus E according to the first embodiment is explained below.

The processor 801 controls the sheet feeding roller R1 or R2 to feed a sheet Sb to be subjected to the decoloring processing from the cassette 505 or 506 to the sheet conveying path.

The double feed sensors 508 perform double feed detection of sheets fed from the cassettes 505 and 506.

If double feed is detected by any of the double feed sensors 508, the processor 801 drives the conveying roller R3 or R4 to discharge the sheets, the double feed of which is detected, to the reject box 509 through the conveying path Pc or Pd.

Subsequently, the processor 801 acquires information by detecting, using the thickness sensor 507, the thickness of one sheet fed without being doubly fed.

If the sheet thickness detected by the thickness sensor 507 exceeds a predetermined threshold, the processor 801 discharges the sheet to the reject box 509 through the conveying paths Pb, Ph, and Pe.

The conveying path Pb is provided further on the upstream side than the line sensor 504 in the sheet conveying direction. This makes it possible to prevent a sheet having thickness exceeding a tolerance in the line sensor 504 from entering the line sensor 504. Therefore, it is possible to prevent occurrence of deficiencies such as a sheet jam and breakage in the line sensor 504.

If sheets are not doubly fed and the sheet thickness does not exceed the predetermined threshold, the processor 801 causes the line sensor 504 to read images on both sides of the sheet.

The processor 801 controls the conveying rollers R6, R7, R5, and the like to discharge a sheet having a "printing ratio" or "printing density", which is detected based on the images read by the line sensor 504, exceeding a predetermined threshold to the reject box 509 through the conveying paths Pi, Pj, and Pe.

The processor 801 (the processing control unit) controls, on the basis of information acquired from the line sensor 504, the thickness sensor 507, and the like, control parameters of the decoloring processing performed by the decoloring processing units 503*a* and 503*b* and the sheet conveying unit in cooperation with each other.

The processor 801 executes, on the basis of the control parameters set to correspond to a sheet to be subjected to the decoloring processing as explained above, the decoloring processing performed by the conveying rollers R6 and R7, the decoloring processing units 503*a* and 503*b*, and the like in cooperation with one another on the sheet.

The processor 801 conveys the sheet subjected to the decoloring processing to the line sensor 504 through the conveying paths Pj and Pg to thereby read images on both sides of the sheet subjected to the decoloring processing.

As a result of the image reading, if it is determined that a color of a colorant remains on the sheet at density equal to or larger than a predetermined value, the processor 801 determines how many times the decoloring processing is already repeated for the sheet. If the decoloring processing is repeated the number of times equal to or larger than a predefined number of times, the processor 801 determines that it is difficult to decolor the colorant and causes the sheet conveying unit to discharge the sheet to the reject box 509 through the conveying paths Pi, Pj, and Pe. History information concerning how many times the decoloring processing is applied to a certain sheet can be stored in, for example, the memory 803 or the HDD 804.

On the other hand, if the decoloring processing is not repeated the number of times equal to or larger than the predefined number of times, the processor 801 executes the decoloring processing again.

The processor 801 reads the images on both the sides of the sheet subjected to the decoloring processing with the line sensor 504. If it is determined that the colorant having density equal to or larger than the predetermined value does not remain on the sheet, the processor 801 causes the sheet conveying unit to discharge the sheet to the discharge cassette 501 or 502 through the conveying paths Pi, Pj, and Pf.

The processor 801 and the ASIC 802 accumulate logs of various kinds of processing performed in the decoloring apparatus E in the HDD 804 as a data table. Further, in order to perform dynamic display processing involved in the execution of the decoloring processing, the processor 801 and the ASIC 802 perform data processing for data addition to the data table on a real time basis every time data that should be added is generated. The processor 801 and the ASIC 802 always refer to the dynamically-updated data table to thereby dynamically update display contents (e.g., data contents of the data table) on the display unit 805*a*.

FIGS. 5 to 7 are diagrams of examples of the data table of the logs of the various kinds of processing accumulated in the HDD 804.

First, the processor 801 and the ASIC 802 register information of items (1) to (6) below in association with an decoloring processing ID issued for each kind of decoloring processing when the decoloring processing is performed in the decoloring apparatus E (see FIG. 5).

(1) Processing execution day (a day when the decoloring processing is executed)
(2) User ID (an ID of a user who instructs execution of the decoloring processing)
(3) Department (a department to which the user having the ID belongs)
(4) Number of decoloring processing executed sheets (the number of sheets subjected to the decoloring processing having the processing ID (on which execution of the decoloring processing is attempted))

(5) Number of decoloring processing successful sheets (the number of sheets for which the decoloring processing having the processing ID is successful)

(6) Number of decoloring processing unsuccessful sheets (the number of sheets for which the decoloring processing having the processing ID is unsuccessful)

Further, the processor 801 and the ASIC 802 register information of items (7) to (10) below in association with the decoloring processing ID issued for each kind of decoloring processing when the decoloring processing is performed in the decoloring apparatus E (see FIG. 6).

(7) Total number of decoloring unsuccessful sheets (a total number of sheets for which the decoloring processing having the processing ID is unsuccessful)

(8) Reuse ratio [%] (a ratio of the number of sheets for which the decoloring processing having the processing ID is successful to the number of sheets on which the decoloring processing is executed (=((5)/(4))×100))

(9) Improvement content guidance ID (an ID indicating guidance contents desired to be presented to the user on the basis of a result of the decoloring processing having the processing ID)

(10) Environmental load contribution ratio (a numerical value obtained by multiplying the number of decoloring processing successful sheets with a predetermined coefficient)

Moreover, the processor 801 and the ASIC 802 register each of predetermined periods and information of items (11) to (13) below concerning processing contents of respective kinds of decoloring processing executed in the periods in association with each other when the decoloring processing is performed in the decoloring apparatus E (see FIG. 7).

(11) Number of in-period printed sheets (the number of sheets on which the print processing is executed in the period in a specific image forming apparatus (e.g., an image forming apparatus with which the decoloring apparatus E can communicate) set in advance)

(12) Number of in-period decoloring processing executed sheets (the number of sheets on which the decoloring processing is executed (the decoloring processing is attempted) in the decoloring apparatus E in the period)

(13) Number of in-period decoloring processing successful sheets (the number of sheets for which the decoloring processing executed by the decoloring apparatus E is successful in the period)

The processor 801 and the ASIC 802 can sort or process each data of the data table, which is stored in the HDD 804, in a desired array or arrangement order and use the data. For example, the processor 801 and the ASIC 802 can generate the data of (7) to (13) by processing or totalizing the data of (1) to (6).

Figure 8:
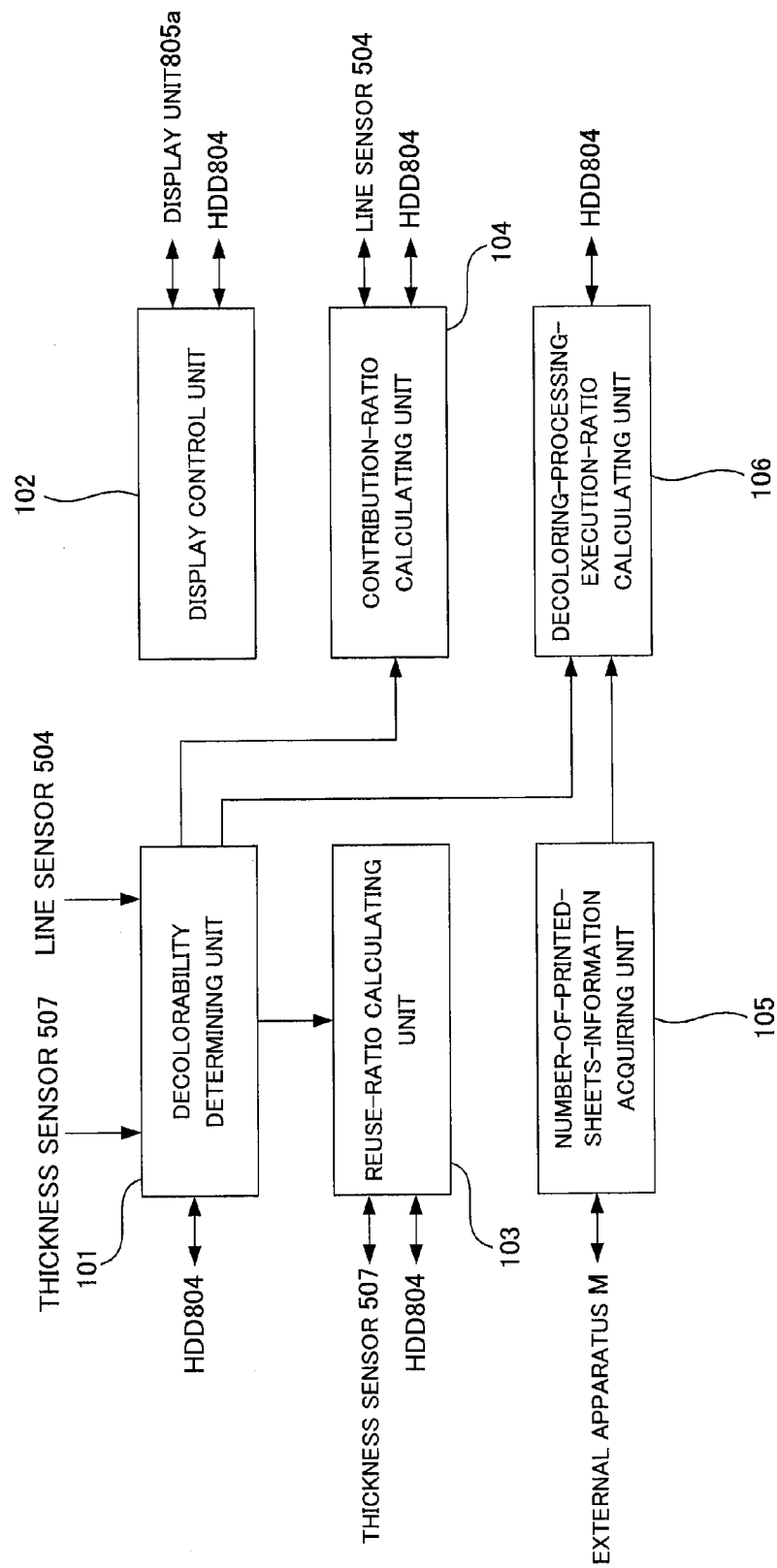
FIG. 8 is a functional block diagram for explaining the decoloring apparatus E according to the first embodiment.

FIG. 8 is a functional block diagram for explaining the decoloring apparatus E according to the first embodiment.

The decoloring apparatus E according to the first embodiment includes an decolorability determining unit 101, a display control unit 102, a reuse-ratio calculating unit 103, a contribution-ratio calculating unit 104, a number-of-printed-sheets-information acquiring unit 105, and an decoloring-processing-execution-ratio calculating unit 106.

The decolorability determining unit 101 determines, on the basis of a detection result in at least one of the line sensor 504 (the image reading unit) and the thickness sensor 507, executability of the decoloring processing in the decoloring processing units 503*a* and 503*b* for a sheet set as the detection target.

If the sheet set as the detection target is a "sheet on which the decoloring processing in the decoloring processing units cannot be executed", the decolorability determining unit 101 determines, on the basis of the detection result in at least one of the line sensor 504 and the thickness sensor 507, to which of plural predetermined results a reason for unexecutability of the decoloring processing corresponds.

In this embodiment, several reference values for "reasons for unexecutability of the decoloring processing" are stored in advance in a storage area such as the HDD 804. If any one of the reference values is exceeded, the decolorability determining unit 101 determines a reason corresponding to the reference value as a "reason for unexecutability of the decoloring processing".

Specific examples of the "reasons for unexecutability of the decoloring processing (unreuseability)" include the following:

(1) an undecolored image remains on a sheet (e.g., the image is drawn by an undecolorable pen such as a ballpoint pen);

(2) there is a bend or a tear in a sheet;

(3) sheets are bundled (e.g., a sheet bundle is stapled); and (4) an object is left on a sheet (e.g., a tag is attached to the sheet).

The display control unit 102 causes, when the decoloring apparatus E is started, the display unit 805*a* to screen-display information stored in the memory 803 or the HDD 804 indicating the number of sheets determined as "decoloring processing unexecutable" by the decolorability determining unit 101.

If the display control unit 102 receives, in the touch panel-type operation unit 805*b*, a display request for a totalization result of "information indicating the number of sheets determined as decoloring processing unexecutable by the decolorability determining unit 101" stored in the memory 803 or the HDD 804 based on information concerning at least one of an "execution day of the decoloring processing" and "identification information of a user who instructs execution of the decoloring processing", the display control unit 102 causes the display unit 805*a* to screen-display the totalization result.

The reuse-ratio calculating unit 103 calculates "information indicating a reuse ratio of a sheet" on the basis of (1) the number of sheets determined as decoloring processing unexecutable by the decolorability determining unit 101 and (2) the number of sheets set as the detection targets by the thickness sensor 507.

The display control unit 102 causes the display unit 805*a* to screen-display the "information indicating a reuse ratio of a sheet".

The display control unit 102 causes, on the basis of a determination result in the decolorability determining unit 101, the display unit 805*a* to screen-display "number of sheets determined as decoloring processing unexecutable because of each of plural reasons for unexecutability of the decoloring processing" in association with "each of the plural reasons for unexecutability of the decoloring processing".

The display control unit 102 causes the display unit 805*a* to screen-display a "predetermined advice content for improving a state of unexecutability of the decoloring processing based on the reason" in association with a "reason for unexecutability of the decoloring processing" determined by the decolorability determining unit 101.

Further, the display control unit 102 causes, on the basis of the determination result in the decolorability determining unit 101, the display unit 805*a* to screen-display the "number of sheets determined as decoloring processing unexecutable because of each of plural reasons for unexecutability of the decoloring processing" in association with "each of the plural reasons for unexecutability of the decoloring processing" and causes the display unit 805*a* to screen-display a predetermined advice content for improving a state of unexecutability of the decoloring processing due to a reason that the number of sheets determined as decoloring processing unexecutable is the largest.

The contribution-ratio calculating unit 104 calculates the "number of sheets actually subjected to the decoloring processing" on the basis of the number of sheets determined as "decoloring processing unexecutable" by the decolorability determining unit 101 and the number of sheets set as the detection targets by the thickness sensor 507 and calculates "environmental load contribution ratio (e.g., a reduction amount of $CO_2$)" calculated by multiplying the number of sheets subjected to the decoloring processing with a specified coefficient.

The display control unit 102 causes the display unit 805a to screen-display the "environmental load contribution ratio" calculated by the contribution-ratio calculating unit 104.

The number-of-printed-sheets-information acquiring unit 105 acquires "information indicating the number of sheets subjected to print processing in an image forming apparatus that can communicate with the decoloring apparatus E".

The decoloring-processing-execution-ratio calculating unit 106 calculates an "decoloring processing execution ratio" that is a ratio of the number of sheets subjected to the decoloring processing, which is calculated on the basis of the number of sheets determined as "decoloring processing unexecutable" by the decolorability determining unit 101 and the number of sheets set as the detection targets by the thickness sensor, to the number of sheets acquired by the number-of-printed-sheets-information acquiring unit 105.

The display control unit 102 causes the display unit 805a to screen-display the "decoloring processing execution ratio".

Figure 9:
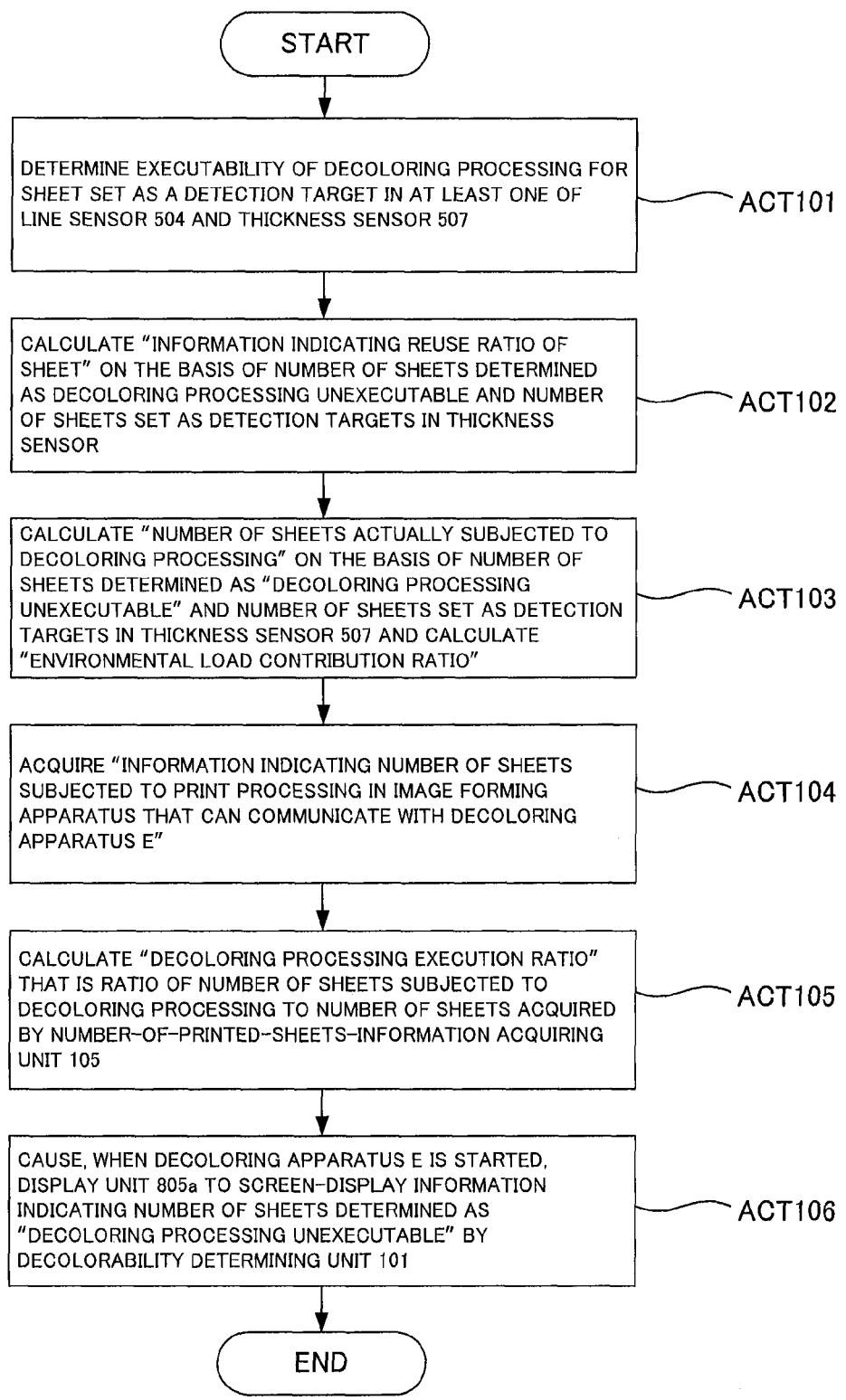
FIG. 9 is a flowchart for explaining a flow of processing (a display control method) in the decoloring apparatus E according to the first embodiment.

FIG. 9 is a flowchart for explaining a flow of processing (a display control method) in the decoloring apparatus E according to the first embodiment. FIGS. 10 to 16 are diagrams of examples of display contents on an interface screen in the decoloring apparatus E according to the first embodiment.

The decolorability determining unit 101 determines decolorability of the decoloring processing in the decoloring processing units 503a and 503b of a sheet set as the detection target in at least one of the line sensor 504 and the thickness sensor 507 (ACT 101).

The reuse-ratio calculating unit 103 calculates "information indicating a reuse ratio of a sheet" on the basis of (1) the number of sheets determined as decoloring processing unexecutable by the decolorability determining unit 101 and (2) the number of sheets set as the detection targets by the thickness sensor 507 (ACT 102).

The contribution-ratio calculating unit 104 calculates the "number of sheets actually subjected to the decoloring processing" on the basis of the number of sheets determined as "decoloring processing unexecutable" and the number of sheets set as the detection targets by the thickness sensor 507 and calculates an "environmental load contribution ratio" calculated by multiplying the number of sheets subjected to the decoloring processing with a specified coefficient (ACT 103).

The number-of-printed-sheets-information acquiring unit 105 acquires "information indicating the number of sheets subjected to the print processing in an image forming apparatus that can communicate with the decoloring apparatus E" (ACT 104).

The decoloring-processing-execution ratio calculating unit 106 calculates an "decoloring processing execution ratio" that is a ratio of the number of sheets subjected to the decoloring processing, which is calculated on the basis of the number of sheets determined as "decoloring processing unexecutable" by the decolorability determining unit 101 and the number of sheets set as the detection targets by the thickness sensor 507, to the number of sheets acquired by the number-of-printed-sheets-information acquiring unit 105 (ACT 105).

The display control unit 102 causes, when the decoloring apparatus E is started, the display unit 805a to screen-display information stored in the memory 803 or the HDD 804 indicating the number of sheets determined as "decoloring processing unexecutable" by the decolorability determining unit 101 (ACT 106).

The display control unit 102 causes the display unit 805a to screen-display "information indicating a reuse ratio of a sheet".

The display control unit 102 causes, on the basis of a determination result in the decolorability determining unit 101, the display unit 805a to screen-display the "number of sheets determined as decoloring processing unexecutable because of each of plural reasons for unexecutability of the decoloring processing" in association with "each of the plural reasons for unexecutability of the decoloring processing".

The display control unit 102 causes the display unit 805a to screen-display, in association with a "reason for unexecutability of the decoloring processing" determined by the decolorability determining unit 101, a "predetermined advice content for improving a state of unexecutability of the decoloring processing based on the reason".

The display control unit 102 causes the display unit 805a to screen-display the "environmental load contribution ratio" calculated by the contribution-ratio calculating unit 104.

The display control unit 102 causes the display unit 805a to screen-display the "decoloring processing execution ratio".

Figure 10:
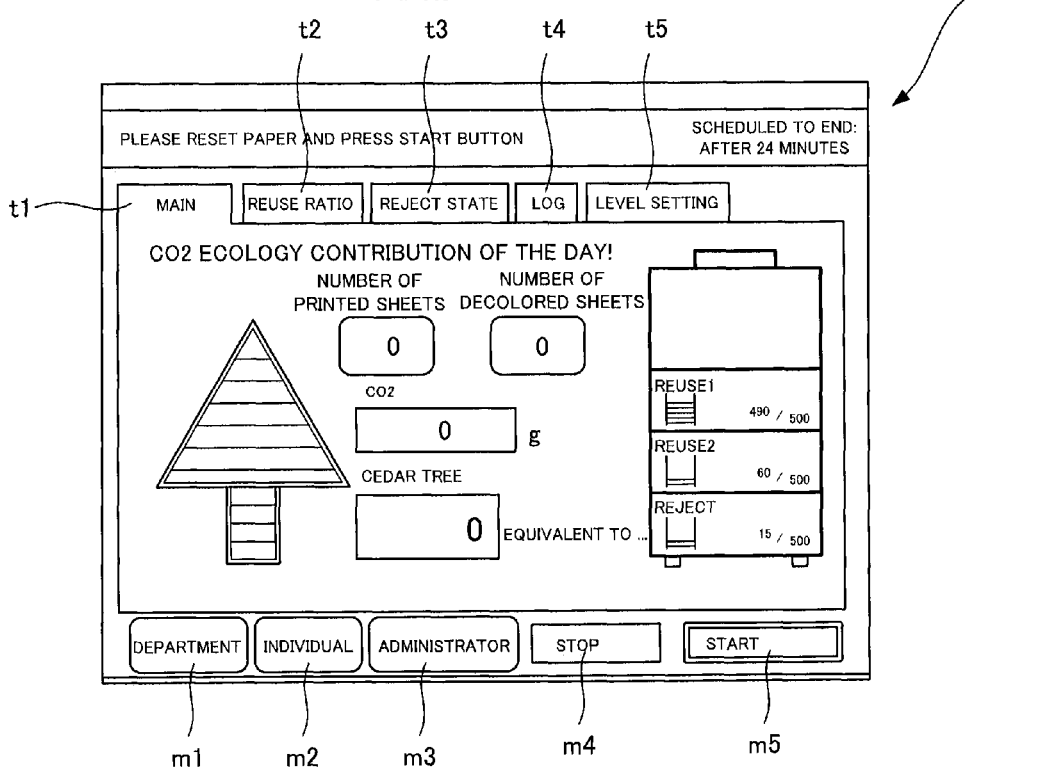
FIG. 10 is a diagram of an example of display contents on an interface screen in the decoloring apparatus E according to the first embodiment.

FIG. 10 is a diagram of an example of a main menu screen displayed on the display unit 805a by the display control unit 102.

On the main menu screen, an arbitrary sheet can be selected by tabs t1 to t5.

Figure 11:
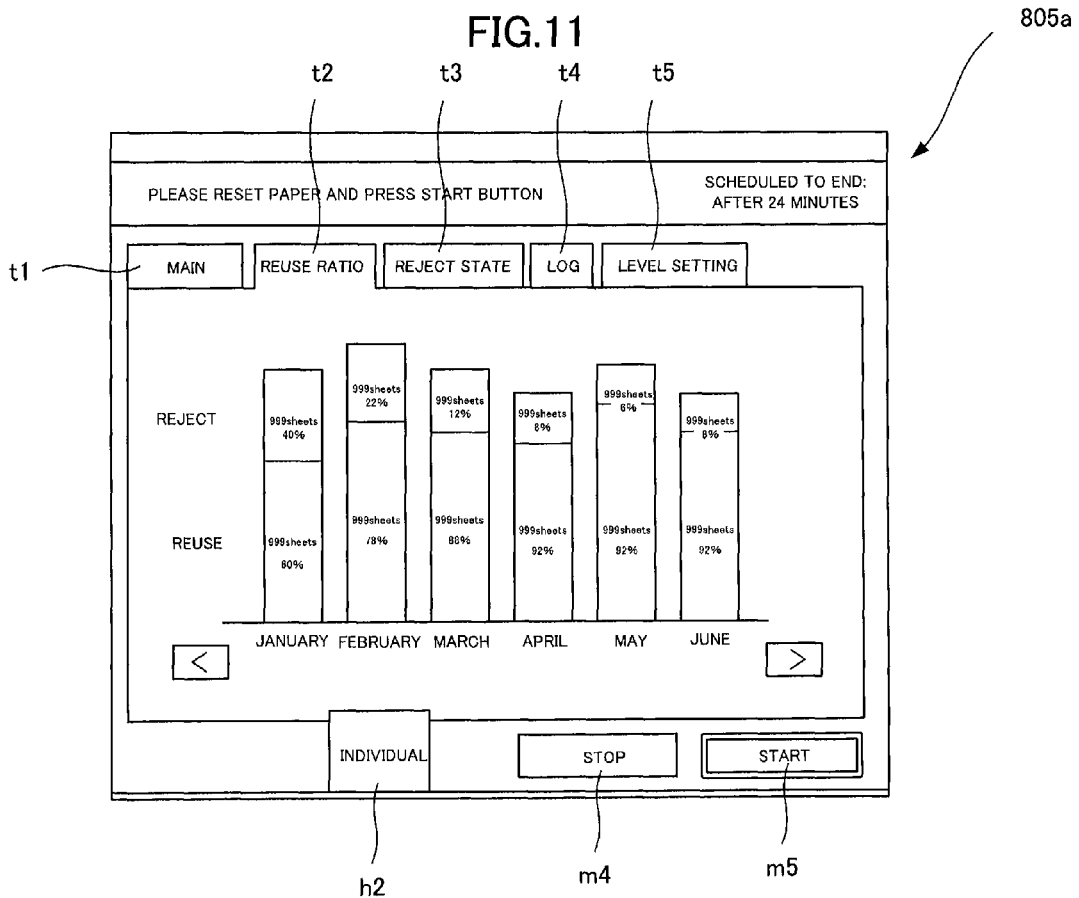
FIG. 11 is a diagram of an example of display contents on the interface screen in the decoloring apparatus E according to the first embodiment.
Figure 12:
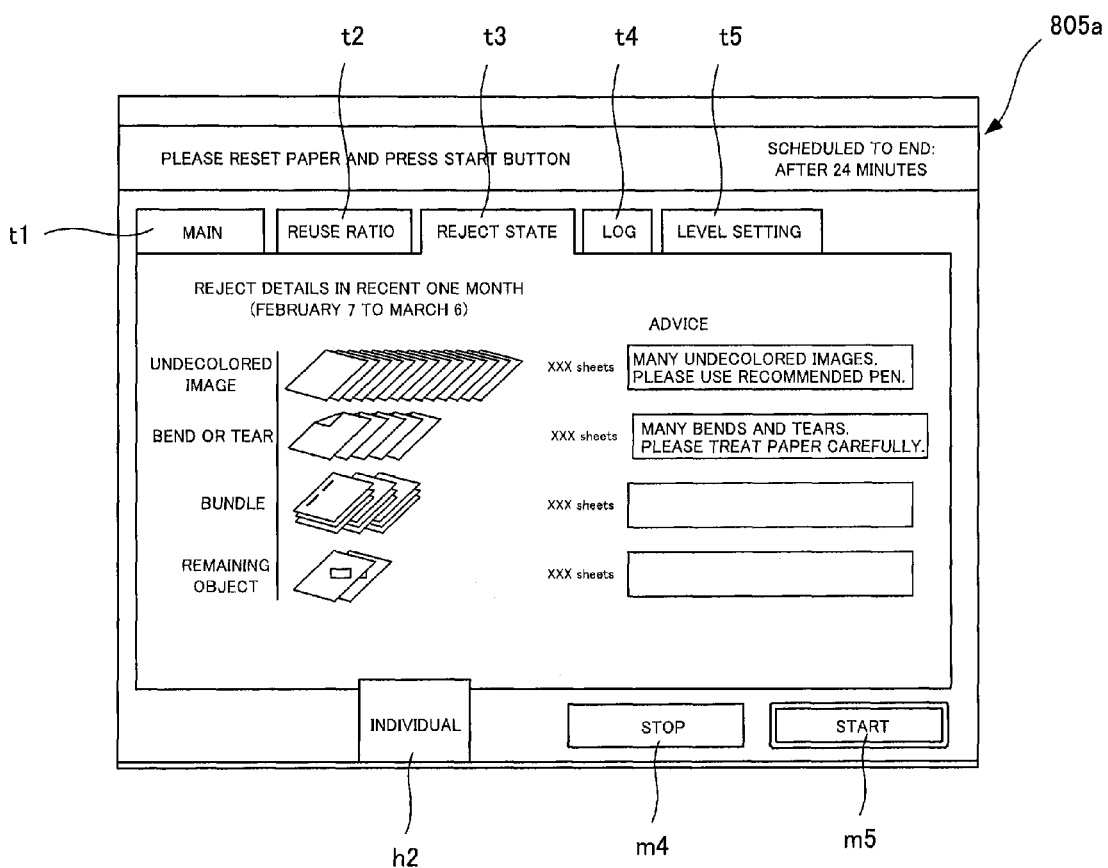
FIG. 12 is a diagram of an example of display contents on the interface screen in the decoloring apparatus E according to the first embodiment.
Figure 13:
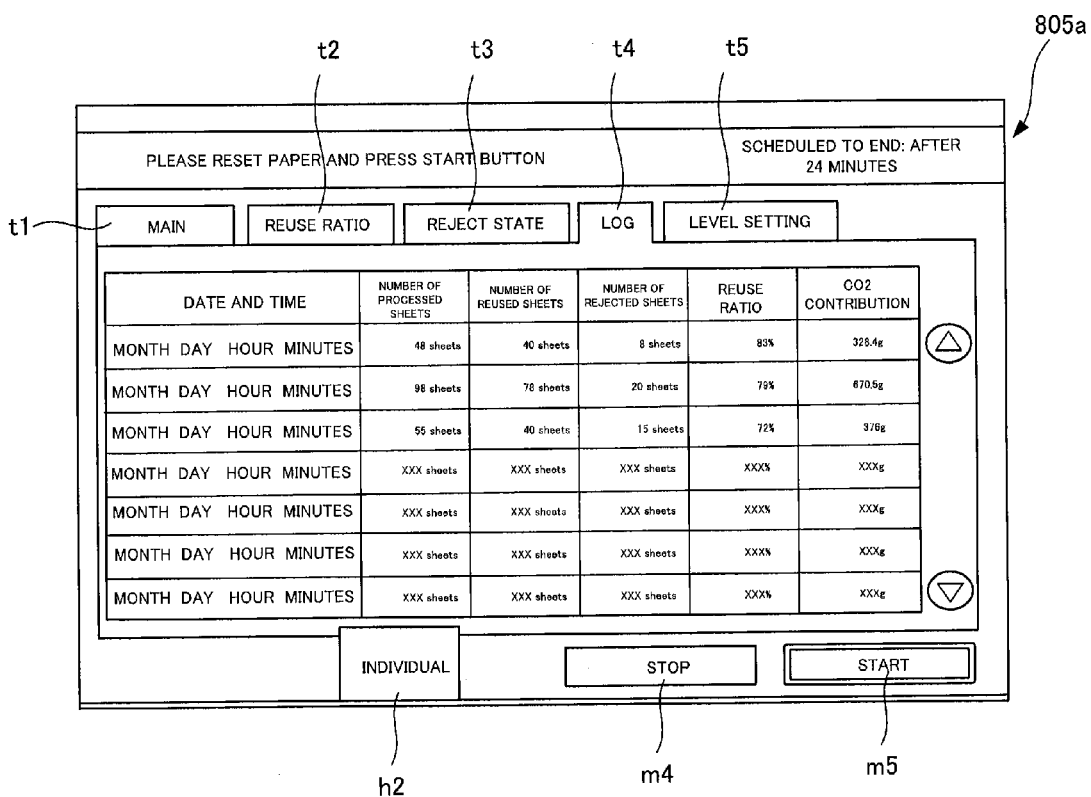
FIG. 13 is a diagram of an example of display contents on the interface screen in the decoloring apparatus E according to the first embodiment.
Figure 14:
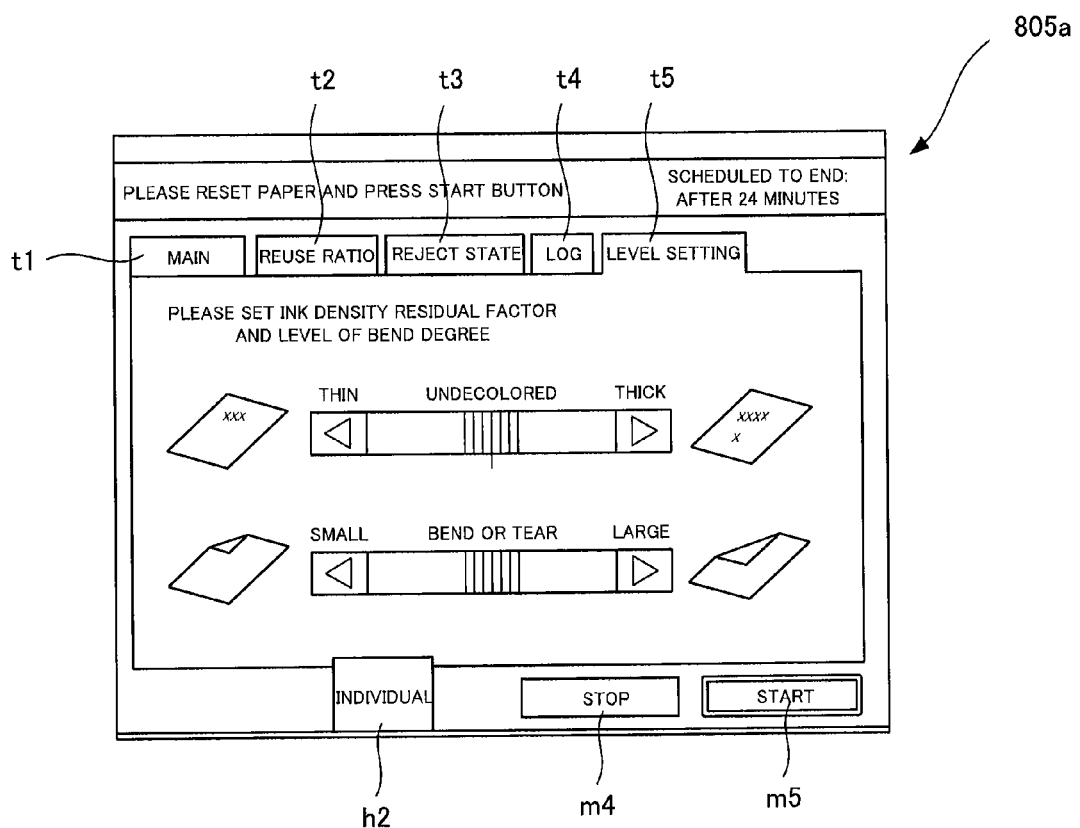
FIG. 14 is a diagram of an example of display contents on the interface screen in the decoloring apparatus E according to the first embodiment.

In FIG. 10, a state in which the tab t1 is selected and a main menu display screen is displayed is shown. In FIG. 11, a state in which the tab t2 is selected and a reuse ratio display screen is displayed is shown. In FIG. 12, a state in which the tab t3 is selected and a reject state display screen is displayed is shown. In FIG. 13, a state in which the tab t4 is selected and a log display screen (on which information such as a $CO_2$ reduction amount and a reuse ratio is displayed) is displayed is shown. In FIG. 14, a state in which the tab t5 is selected and a level setting display screen is displayed is shown.

On the main menu screen shown in FIG. 10, a department button m1, an individual button m2, an administrator button m3, a stop button m4, and a start button m5 are displayed on a lower side of the screen.

When the user causes the IC card reader 807 to read an IC card in which ID information of the user is stored and performs personal authentication, the user can view, by pressing the individual button m2, a totalization result of information concerning a processing result of decoloring processing (based on information stored in the HDD 804 in association with the ID information of the user) that the user causes the decoloring apparatus E to perform.

When the user causes the IC card reader 807 to read the IC card in which the ID information of the user is stored, performs personal authentication, and then presses the department button m1, the user can view a totalization result concerning decoloring processing based on information associated with a department to which the user belongs.

In FIGS. 11 to 14, screen display examples displayed when the tabs t2 to t5 are respectively selected in a state in which the user, who performs the personal authentication, presses the individual button m2 are shown.

Figure 15:
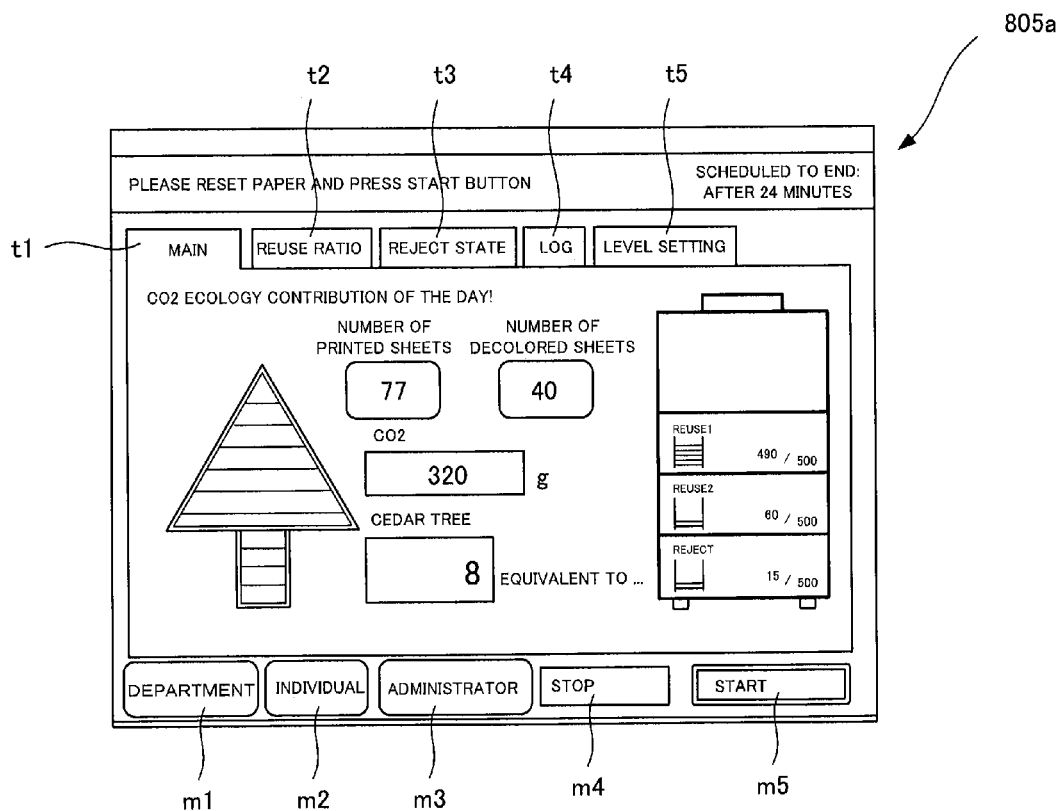
FIG. 15 is a diagram of an example of display contents on the interface screen in the decoloring apparatus E according to the first embodiment.

FIG. 15 is a diagram of a screen display example on the display unit 805a in a state in which the user presses the start button m5 and the decoloring processing in the decoloring apparatus E is started.

As shown in FIG. 15, values of the "number of printed sheets", the "number of sheets subjected to the decoloring processing in the decoloring apparatus E", a "$CO_2$ amount reduced by the execution of the decoloring processing", and the "number of cedar trees indicating contribution to the environment by the execution of the decoloring processing", which are zero before the start of the decoloring processing, are updated and displayed on a real time basis according to the start of the decoloring processing.

Figure 16:
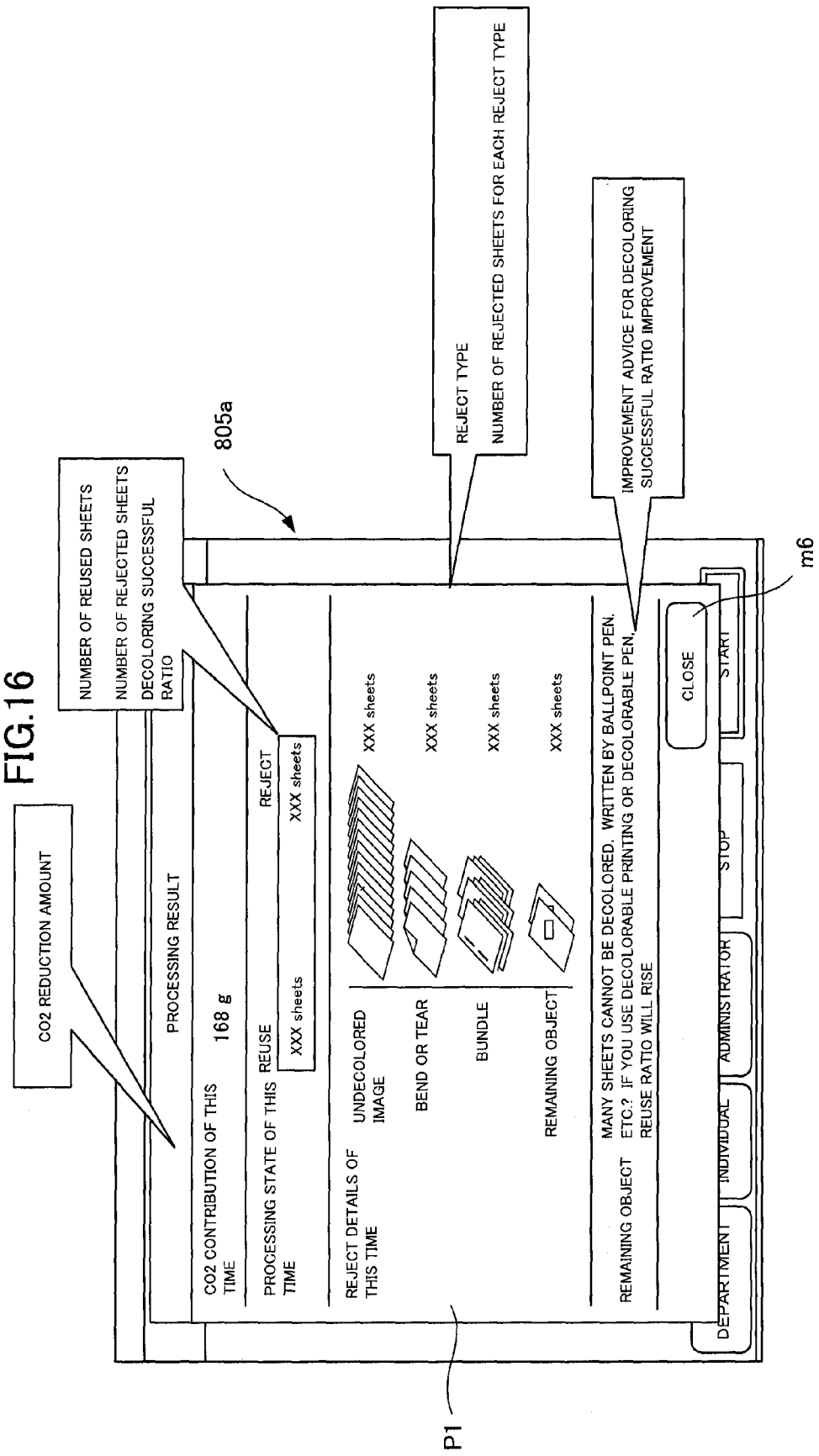
FIG. 16 is a diagram of an example of display contents on the interface screen in the decoloring apparatus E according to the first embodiment.

FIG. 16 is a diagram of a screen display example on the display unit 805a at the time when the decoloring processing in the decoloring apparatus E is completed.

As shown in FIG. 16, the display control unit 102 causes, on the basis of a determination result in the decolorability determining unit 101, the display unit 805a to classify and display the "number of sheets determined as decoloring processing unexecutable because of each of plural reasons for unexecutability of the decoloring processing" in association with "each of the plural reasons for unexecutability of the decoloring processing".

The display control unit 102 causes the display unit 805a to screen-display a predetermined improvement advice for improving a state of unexecutability of the decoloring processing due to a reason that the number of sheets determined as decoloring processing unexecutable is the largest.

Figure 17:
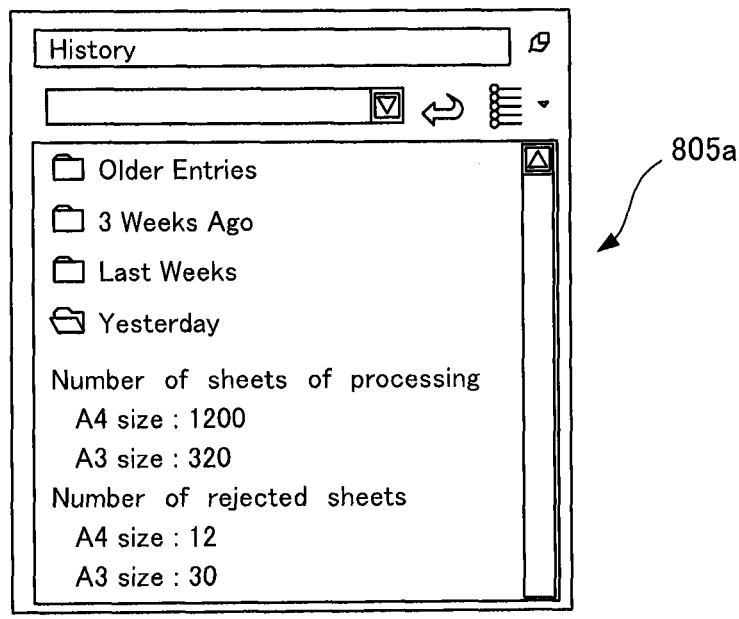
FIG. 17 is a diagram of an example of a history screen displayed on a display unit 805*a* by a display control unit 102.

FIG. 17 is an example of a history screen displayed on the display unit 805a by the display control unit 102.

On the history screen, as an example, predetermined various periods such as "Older Entries", "3 Weeks Ago", "Last Week", and "Yesterday" are represented by folder icons. If the user operates the touch panel-type operation unit 805b to select a desired icon among a group of the folder icons, the display control unit 102 causes the display unit 805a to screen-display totalization information corresponding to the folder icon.

Figure 18:
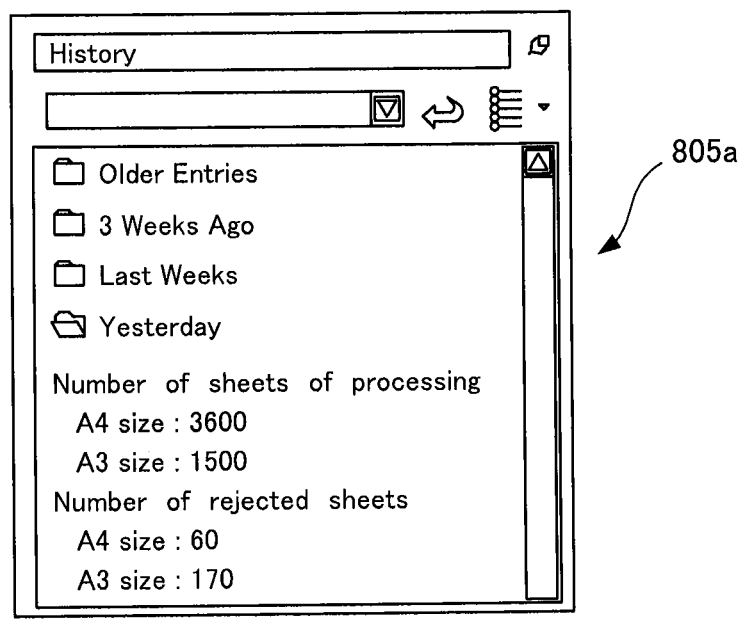
FIG. 18 is a diagram of a state in which a folder icon "Yesterday" is selected and a totalization result is screen-displayed on the display unit 805*a*.

FIG. 18 is a diagram of a state in which the folder icon "Yesterday" is selected and a totalization result of information stored in the HDD 804 as information indicating contents of decoloring processing executed in the decoloring apparatus E yesterday is displayed on the display unit 805a.

According to timing of the start of the decoloring apparatus E, for example, if the decoloring apparatus E is started on Monday, as shown in FIG. 11, the display control unit 102 acquires information indicating a processing result of decoloring processing performed last week in the decoloring apparatus E from the HDD 804 and causes the display unit 805a to screen-display the information.

The operations in the processing in the decoloring apparatus E are realized by causing the processor 801 to execute a computer program stored in the memory 803.

By adopting such a configuration, the user can easily grasp a state of decoloring processing performed by the user and a state of decoloring processing in the department to which the user belongs. As a result, it is possible to improve awareness of the user concerning paper reuse and improve promotion of reuse of paper.

Further, according to the first embodiment, for example, it is possible to provide an decoloring apparatus having a configuration explained below.

(1). An decoloring apparatus including:
an decoloring processing unit configured to subject a sheet on which an image is formed with an decolorable colorant to decoloring processing for decoloring a color of the decolorable colorant;
a sheet conveying unit configured to convey the sheet and cause the sheet to pass through the decoloring processing unit;
an image reading unit arranged further on an upstream side than the decoloring processing unit in a sheet conveying direction by the sheet conveying unit and configured to read the image formed on the sheet conveyed by the sheet conveying unit;
a thickness sensor arranged further on the upstream side than the decoloring processing unit in the sheet conveying direction by the sheet conveying unit and configured to detect the thickness of the sheet conveyed by the sheet conveying unit;
an decolorability determining unit configured to determine, on the basis of a detection result in at least one of the image reading unit and the thickness sensor, executability of the decoloring processing in the decoloring processing unit of the sheet set as a detection target;
a storing unit configured to store information indicating the number of sheets determined as decoloring processing unexecutable by the decolorability determining unit;
a display; and
a display control unit configured to cause, when the apparatus is started, the display to screen-display the information stored in the storing unit indicating the number of sheets determined as decoloring processing unexecutable by the decolorability determining unit.

(2). The apparatus of (1), wherein
the storing unit stores at least one of an execution day of the decoloring processing and identification information of a user who instructs an execution of the decoloring processing and the information indicating the number of sheets determined as decoloring processing unexecutable by the decolorability determining unit in association with each other,
the apparatus further includes an operation input unit configured to receive an operation input of the user, and
if the display control unit receives, in the operation input unit, a display request for a totalization result of the information stored in the storing unit indicating the number of sheets determined as decoloring processing unexecutable by the decolorability determining unit, which is based on information concerning at least one of the execution day of the decoloring processing and the identification information of the user who instructs the execution of the decoloring processing, the display control unit causes the display to screen-display the totalization result.

(3). The apparatus of (1), further including a reuse-ratio calculating unit configured to calculate information indicating a reuse ratio of the sheet on the basis of the number of sheets determined as decoloring processing unexecutable by the decolorability determining unit and the number of sheets set as the detection targets by the thickness sensor, wherein
the display control unit causes the display to screen-display the information indicating the reuse ratio of the sheet.

(4). The apparatus of (1), wherein, if the sheet set as the detection target is a sheet on which the decoloring processing in the decoloring processing unit cannot be executed, the decolorability determining unit determines, on the basis of the detection result in at least one of the image reading unit and the thickness sensor, to which of plural predetermined reasons a reason for unexecutability of the decoloring processing corresponds.

(5). The apparatus of (4), wherein the display control unit causes, on the basis of a determination result in the decolorability determining unit, the display to screen-display the number of sheets determined as decoloring processing unexecutable because of each of the plural reasons for unexecutability of the decoloring processing in association with each of the plural reasons for unexecutability of the decoloring processing.

(6). The apparatus of (4), wherein the display control unit causes the display to screen-display, in association with the reason for decoloring processing unexecutability determined by the decolorability determining unit, a predetermined advice content for improving a state of unexecutability of the decoloring processing based on the reason.

(7). The apparatus of (4), wherein the display control unit causes, on the basis of a determination result in the decolorability determining unit, the display to screen-display the number of sheets determined as decoloring processing unexecutable because of each of the plural reasons for unexecutability of the decoloring processing in association with each of the plural reasons for unexecutability of the decoloring processing and causes the display to screen-display a predetermined advice content for improving a state of unexecutability of the decoloring processing due to a reason that the number of sheets determined as decoloring processing unexecutable is the largest.

(8). The apparatus of (1), further including a contribution-ratio calculating unit configured to calculate the number of sheets subjected to the decoloring processing on the basis of the number of sheets determined as decoloring processing unexecutable by the decolorability determining unit and the number of sheets set as the detection targets by the thickness sensor and calculate an environmental load contribution ratio calculated by multiplying the number of sheets subjected to the decoloring processing with a specified coefficient, wherein the display control unit causes the display to screen-display the environmental load contribution ratio calculated by the contribution-ratio calculating unit.

(9). The apparatus of (8), wherein the environmental load contribution ratio is a reduction amount of $CO_2$.

(10). The apparatus of (1), further including:

a number-of-printed-sheets-information acquiring unit configured to acquire information indicating the number of sheets subjected to print processing in an image forming apparatus that can communicate with the decoloring apparatus; and an decoloring-processing-execution-ratio calculating unit configured to calculate an decoloring processing execution ratio that is a ratio of the number of sheets subjected to the decoloring processing, which is calculated on the basis of the number of sheets determined as decoloring processing unexecutable by the decolorability determining unit and the number of sheets set as the detection targets by the thickness sensor, to the number of sheets acquired by the number-of-printed-sheets-information acquiring unit, wherein the display control unit causes the display to screen-display the decoloring processing execution ratio.

(11). The apparatus of (1), wherein the display control unit causes, when the apparatus is started, the display to screen-display a totalization result of information stored in the storing unit indicating a processing result of the decoloring processing executed in a predetermined period in the past.

Second Embodiment

A second embodiment is explained below.

The second embodiment is a modification of the first embodiment explained above. Therefore, components having functions same as those of the components already explained in the first embodiment are denoted by the same reference numerals and signs and explanation of the components is omitted.

Figure 19:
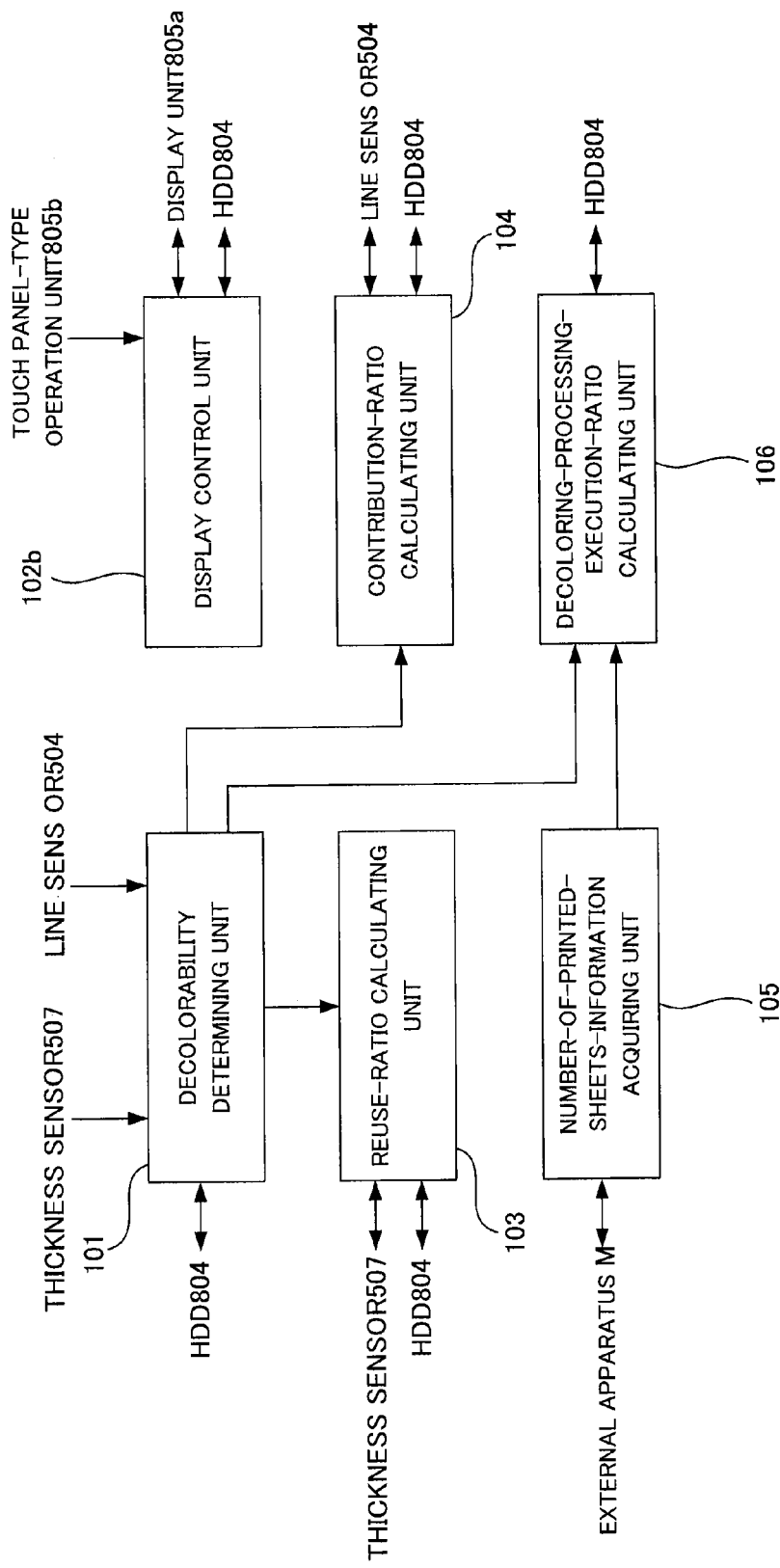
FIG. 19 is a functional block diagram for explaining an decoloring apparatus E2 according to a second embodiment.

FIG. 19 is a functional block diagram for explaining an decoloring apparatus E2 according to the second embodiment.

The decoloring apparatus E2 according to the second embodiment includes a display control unit 102b instead of the display control unit 102 in the decoloring apparatus E according to the first embodiment. The display control unit 102b has functions explained below in addition to the functions of the display control unit 102 in the decoloring apparatus E according to the first embodiment.

The display control unit 102b causes, for example, every time a predetermined time elapses, the display unit 805a to sequentially switch and display each of plural totalization results different from each other based on information stored in the HDD 804 indicating the number of sheets determined as decoloring processing unexecutable by the decolorability determining unit.

The HDD 804 stores an execution day of decoloring processing and information indicating the number of sheets determined as decoloring processing unexecutable by the decolorability determining unit in association with each other.

If a display request for the totalization results is input to the touch panel-type operation unit 805b, the display control unit 102b can also cause the display unit 805a to sequentially switch and display each of the plural totalization results (e.g., totalization results that can be viewed by selecting the tabs t1 to t4) different from one another based on "information indicating the number of sheets determined as decoloring processing unexecutable by the decolorability determining unit" stored in the HDD 804.

Figure 20:
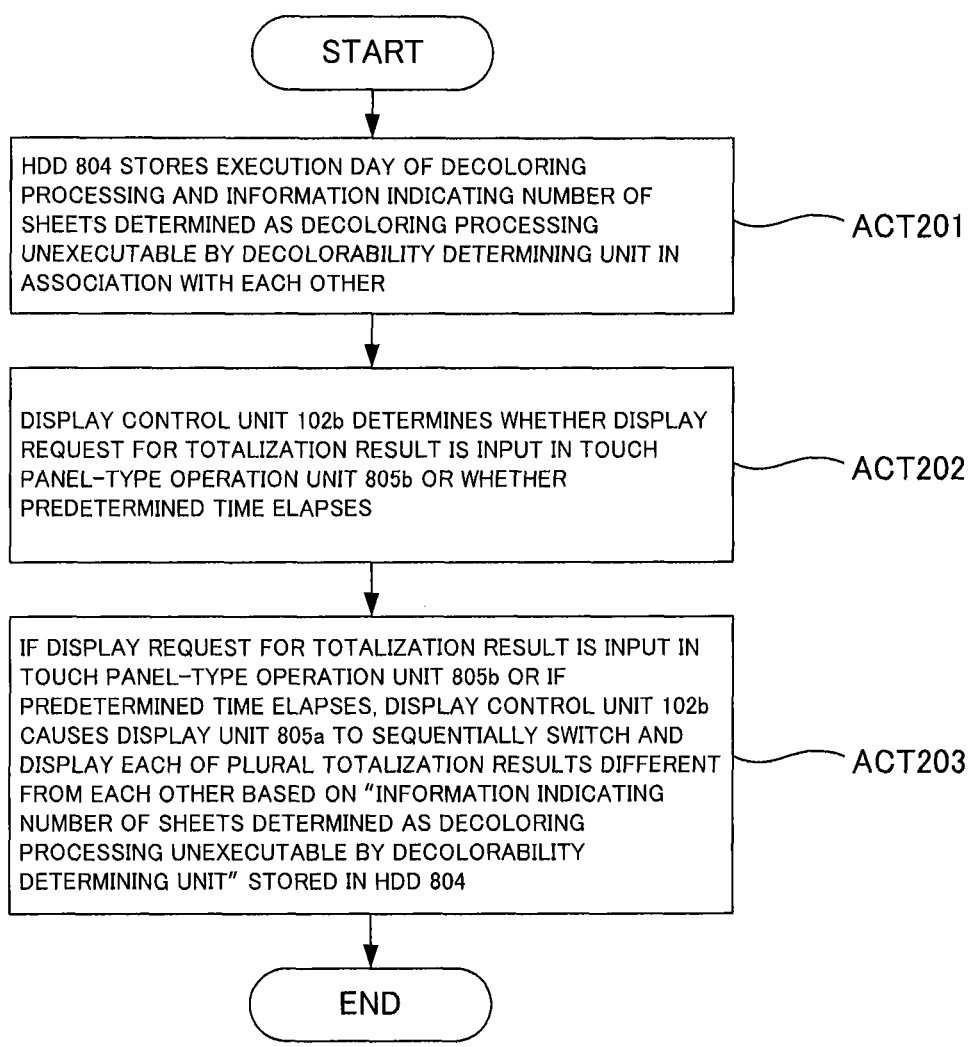
FIG. 20 is a flowchart for explaining a flow of processing (a display control method) in the decoloring apparatus E2 according to the second embodiment.

FIG. 20 is a flowchart for explaining a flow of processing (a display control method) in the decoloring apparatus E2 according to the second embodiment. The decoloring apparatus E2 according to the second embodiment executes processing explained below in addition to the processing in the decoloring apparatus E according to the first embodiment.

The HDD 804 stores an execution day of decoloring processing and information indicating the number of sheets determined as decoloring processing unexecutable by the decolorability determining unit in association with each other (ACT 201).

The display control unit 102b determines whether a display request for a totalization result is input in the touch panel-type operation unit 805b or whether a predetermined time elapses (ACT 202).

The display control unit 102b causes the display unit 805a to sequentially switch and display each of plural totalization results (e.g., totalization results that can be viewed by selecting the tabs t1 to t4) different from one another based on "information indicating the number of sheets determined as decoloring processing unexecutable by the decolorability determining unit" stored in the HDD 804 (ACT 203).

Figure 21:
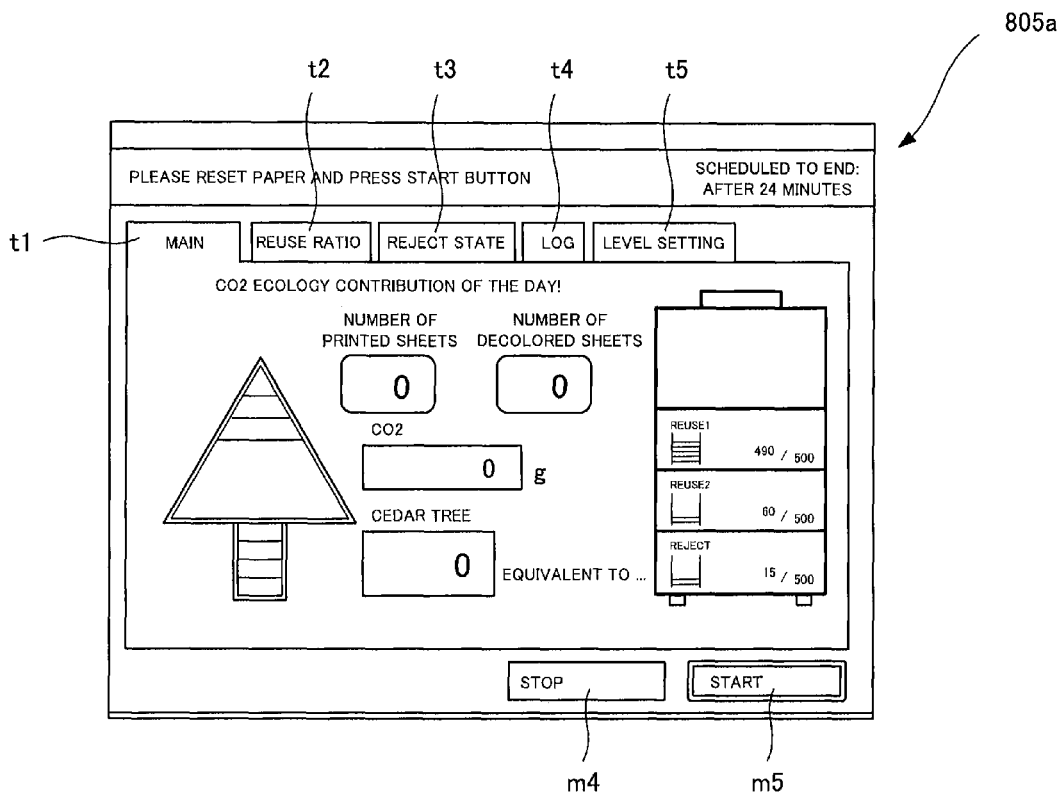
FIG. 21 is a diagram of an example of a screen displayed on the display unit 805*a* by a display control unit 102*b* in the second embodiment.
Figure 22:
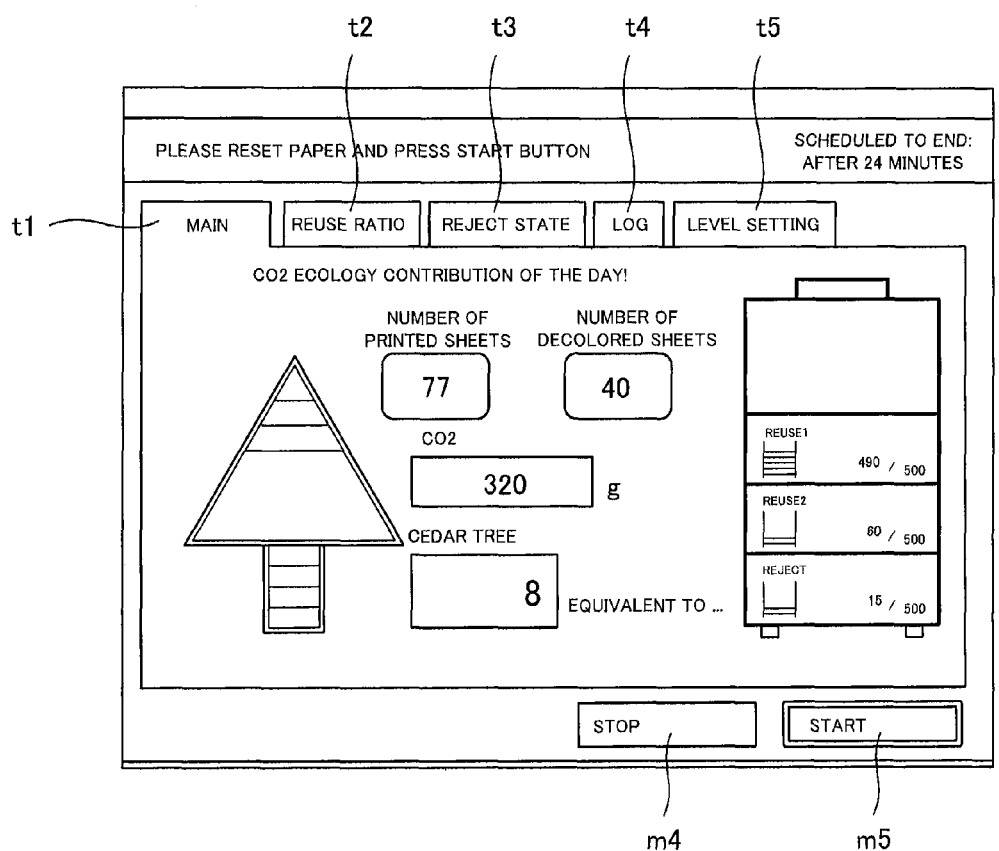
FIG. 22 is a diagram of an example of a screen displayed on the display unit 805*a* by the display control unit 102*b* in the second embodiment.
Figure 23:
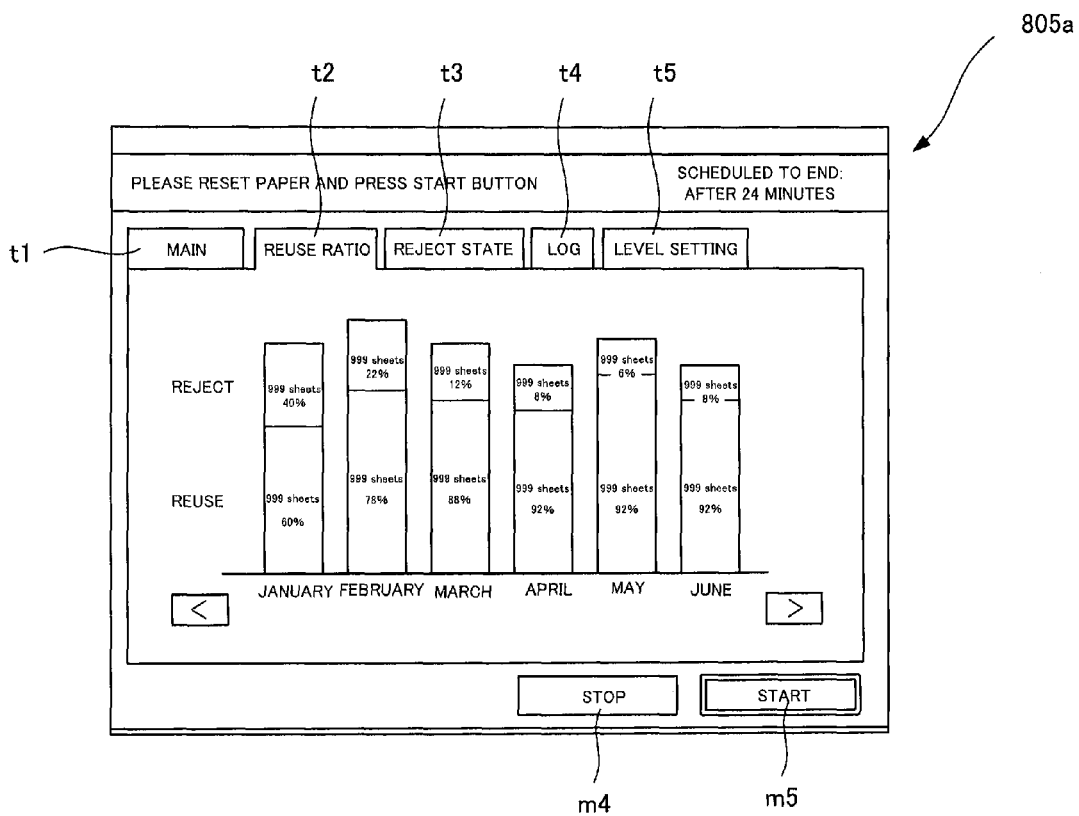
FIG. 23 is a diagram of an example of a screen displayed on the display unit 805*a* by the display control unit 102*b* in the second embodiment.

FIGS. 21 to 23 are diagrams of examples of screens displayed on the display unit 805a by the display control unit 102b in the decoloring apparatus E2 according to the second embodiment.

As shown in FIGS. 21 to 23, the display control unit 102*b* automatically sequentially switches and displays, every time a predetermined time (e.g., three minutes) elapses, menu screens displayed by selecting the tabs t1 to t5.

By adopting such a configuration, a user can easily grasp a sheet reuse ratio by the decoloring processing on the basis of various totalization results. As a result, it is possible to improve awareness of the user concerning paper reuse and improve promotion of reuse of paper.

Further, according to the second embodiment, for example, it is possible to provide an decoloring apparatus having a configuration explained below.

(1). The decoloring apparatus having the configuration explained above: wherein the storing unit stores an execution day of decoloring processing and information indicating the number of sheets determined as decoloring processing unexecutable by the decolorability determining unit in association with each other, and the display control unit causes, every time a predetermined time elapses, the display to sequentially switch and display each of plural totalization results different from one another based on the information stored in the storing unit indicating the number of sheets determined as decoloring processing unexecutable by the decolorability determining unit.

(2). The decoloring apparatus having the configuration explained above, further including:

an operation input unit configured to receive an operation input of a user, wherein the storing unit stores an execution day of decoloring processing and information indicating the number of sheets determined as decoloring processing unexecutable by the decolorability determining unit in association with each other, and if a display request for a totalization result is input in the operation input unit, the display control unit causes the display to sequentially switch and display each of plural totalization results different from one another based on the information stored in the storing unit indicating the number of sheets determined as decoloring processing unexecutable by the decolorability determining unit.

Third Embodiment

A third embodiment is explained below.

The third embodiment is a modification of the embodiments explained above. Therefore, components having functions same as those of the components already explained in the embodiments are denoted by the same reference numerals and signs and explanation of the components is omitted.

Figure 24:
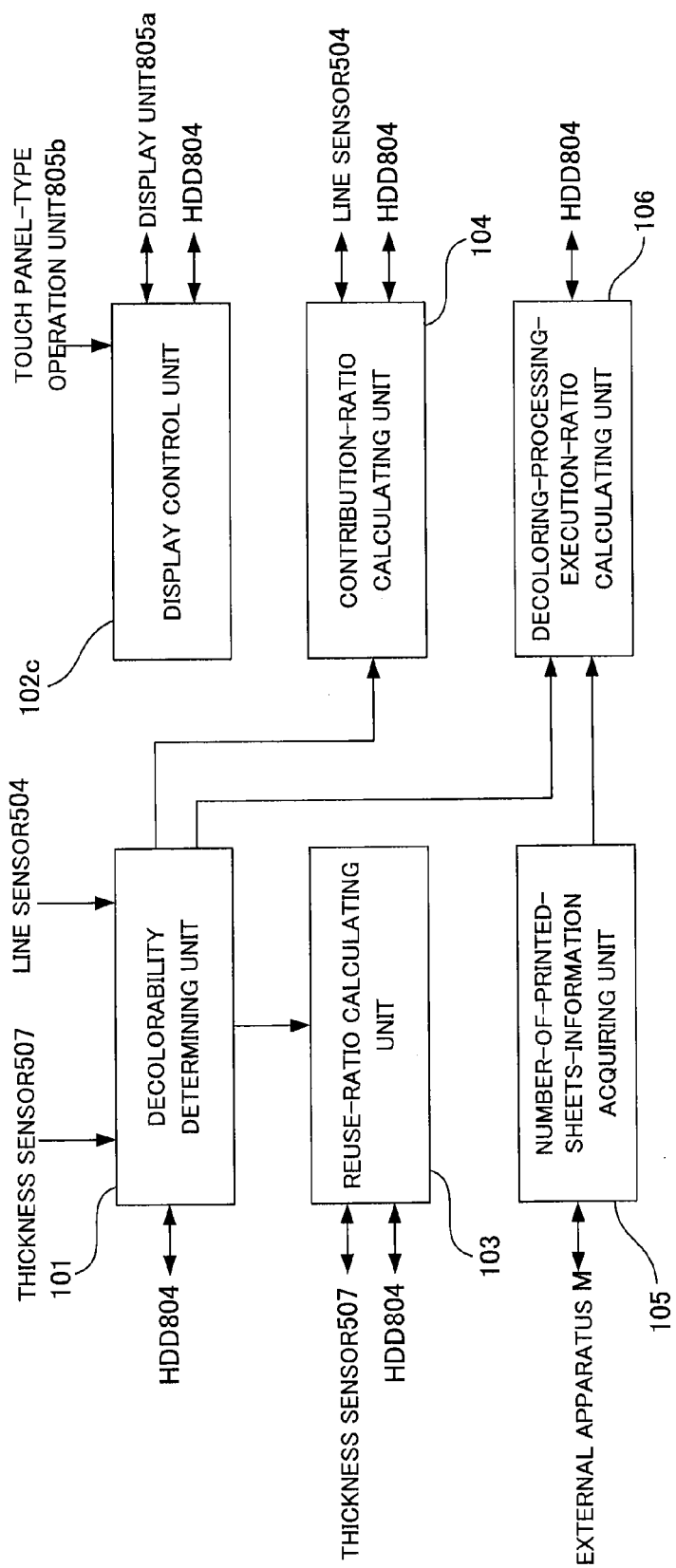
FIG. 24 is a functional block diagram for explaining an decoloring apparatus E3 according to a third embodiment.

FIG. 24 is a functional block diagram for explaining an decoloring apparatus E3 according to the third embodiment.

The decoloring apparatus E3 according to the third embodiment includes a display control unit 102*c* instead of the display control unit 102 in the decoloring apparatus E according to the first embodiment. The display control unit 102*c* has functions explained below in addition to the functions of the display control unit 102 in the decoloring apparatus E according to the first embodiment.

The display control unit 102*c* causes, when decoloring processing is completed, the display unit 805*a* to screen-display "information indicating the number of sheets determined as decoloring processing unexecutable by the decolorability determining unit 101" stored in the storing unit.

Figure 25:
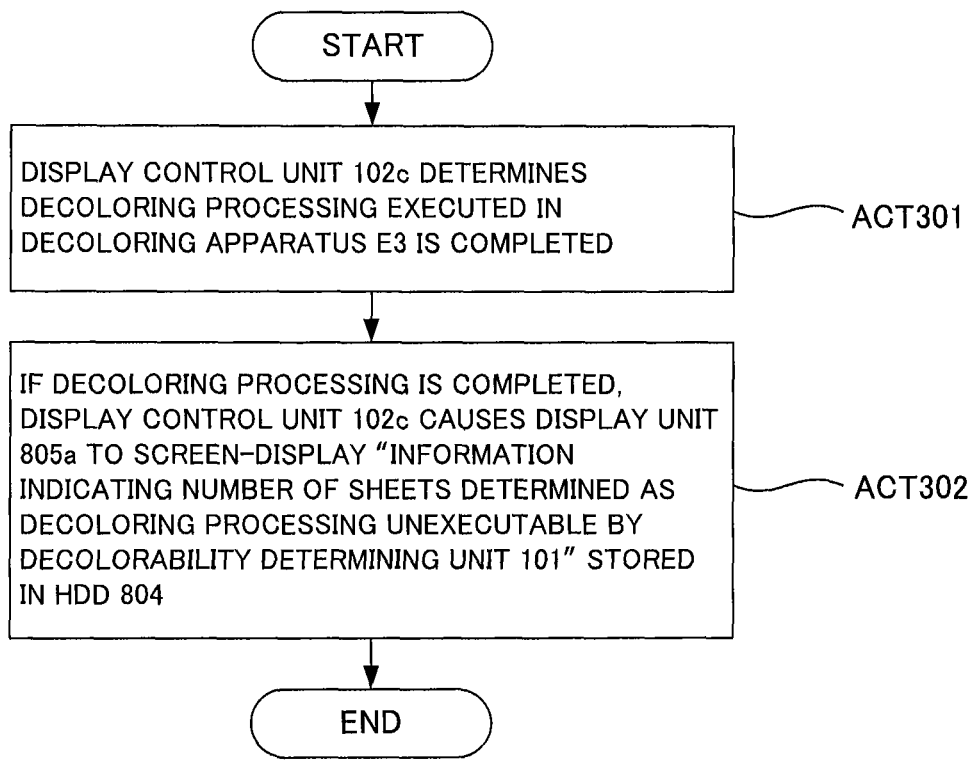
FIG. 25 is a flowchart for explaining a flow of processing (a display control method) in the decoloring apparatus E3 according to the third embodiment.

FIG. 25 is a flowchart for explaining a flow of processing (a display control method) in the decoloring apparatus E3 according to the third embodiment. The decoloring apparatus E3 according to the third embodiment executes processing explained below in addition to the processing according to the embodiments.

The display control unit 102*c* determines whether decoloring processing executed in the decoloring apparatus E3 is completed (ACT 301).

If the decoloring processing is completed, the display control unit 102*c* causes the display unit 805*a* to screen-display "information indicating the number of sheets determined as decoloring processing unexecutable by the decolorability determining unit 101" stored in the HDD 804 (ACT 302).

Figure 26:
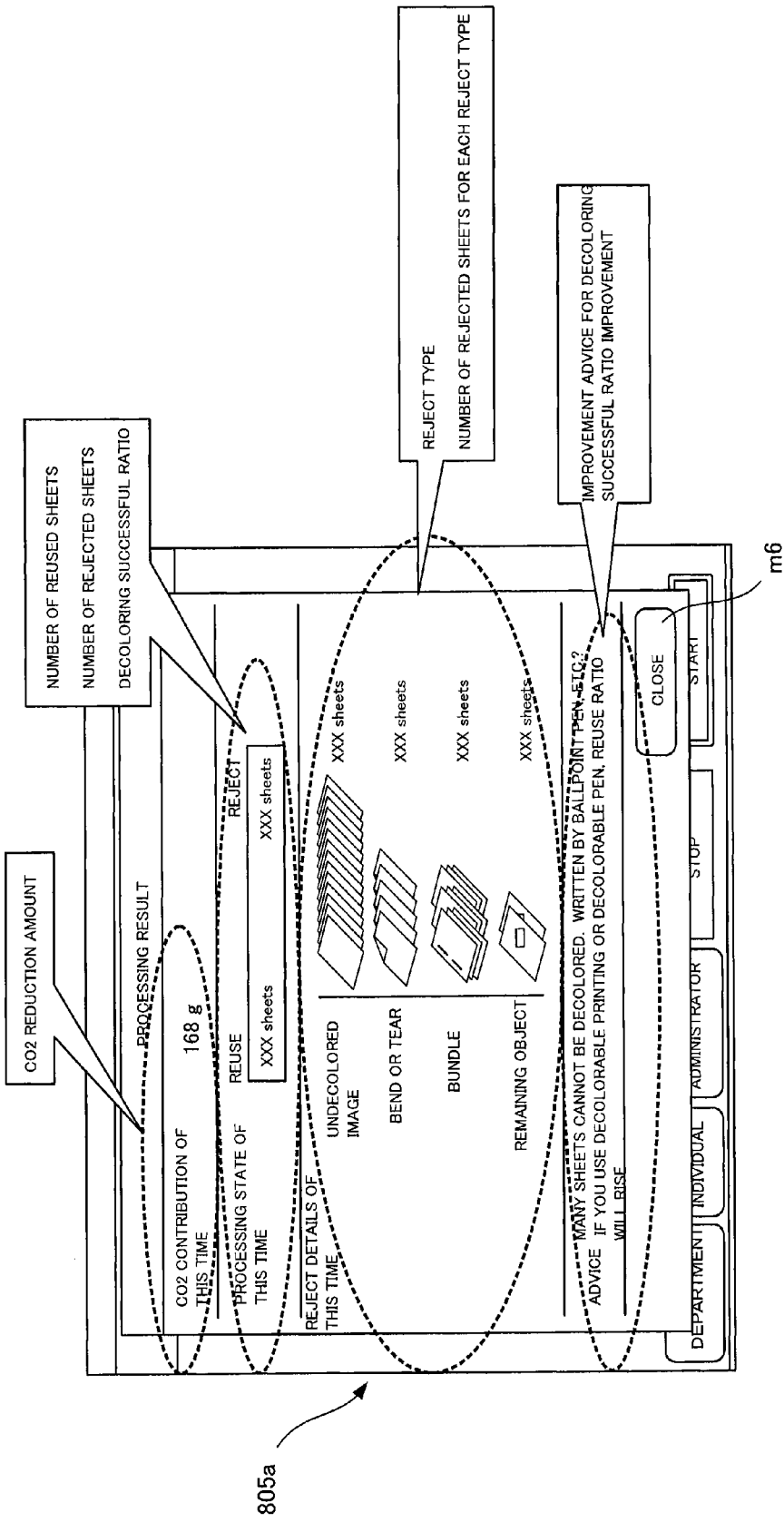
FIG. 26 is a diagram of a state in which, when decoloring processing in the decoloring apparatus E3 is completed, a totalization result and the like of various kinds of information concerning a result of the decoloring processing are screen-displayed.

FIG. 26 is a diagram of a state in which the display unit 805*a* displays a totalization result and the like of various kinds of information concerning a result of the decoloring processing in the decoloring apparatus E3 when the decoloring processing in the decoloring apparatus E3 is completed.

In this way, according to the third embodiment, a user can grasp, immediately after completion of decoloring processing instructed by the user, totalization data of a processing result of the decoloring processing (an environment contribution ratio, a degree of $CO_2$ reduction, etc.). As a result, it is possible to improve awareness of the user concerning paper reuse and improve promotion of reuse of paper.

Further, according to the third embodiment, for example, it is possible to provide an decoloring apparatus having a configuration explained below.

(1). An decoloring apparatus including:

an decoloring processing unit configured to subject a sheet on which an image is formed with an decolorable colorant to decoloring processing for decoloring a color of the decolorable colorant;

a sheet conveying unit configured to convey the sheet and cause the sheet to pass through the decoloring processing unit;

an image reading unit arranged further on an upstream side than the decoloring processing unit in a sheet conveying direction by the sheet conveying unit and configured to read the image formed on the sheet conveyed by the sheet conveying unit;

a thickness sensor arranged further on the upstream side than the decoloring processing unit in the sheet conveying direction by the sheet conveying unit and configured to detect the thickness of the sheet conveyed by the sheet conveying unit;

an decolorability determining unit configured to determine, on the basis of a detection result in at least one of the image reading unit and the thickness sensor, executability of the decoloring processing in the decoloring processing unit of the sheet set as a detection target;

a storing unit configured to store information indicating the number of sheets determined as decoloring processing unexecutable by the decolorability determining unit;

a display; and a display control unit configured to cause, when the decoloring processing is completed, the display to screen-display the information stored in the storing unit indicating the number of sheets determined as decoloring processing unexecutable by the decolorability determining unit.

(2). The apparatus of (1), wherein the storing unit stores at least one of an execution day of the decoloring processing and identification information of a user who instructs an execution of the decoloring processing and the information indicating the number of sheets determined as decoloring processing unexecutable by the decolorability determining unit in association with each other, the apparatus further includes an operation input unit configured to receive an operation input of the user, and if the display control unit receives, in the operation input unit, a display request for a totalization result of the information stored in the storing unit indicating the number of sheets determined as decoloring processing unexecutable by the decolorability determining unit, which is based on information concerning at least one of the execution day of the decoloring processing and the identification information of the user who instructs the execution of the decoloring processing, the display control unit causes the display to screen-display the totalization result.

(3). The apparatus of (1), further including a reuse-ratio calculating unit configured to calculate information indicating a reuse ratio of the sheet on the basis of the number of sheets determined as decoloring processing unexecutable by the decolorability determining unit and the number of sheets set as the detection targets by the thickness sensor, wherein the display control unit causes the display to screen-display the information indicating the reuse ratio of the sheet.

(4). The apparatus of (1), wherein, if the sheet set as the detection target is a sheet on which the decoloring processing in the decoloring processing unit cannot be executed, the decolorability determining unit determines, on the basis of the detection result in at least one of the image reading unit and the thickness sensor, to which of plural predetermined reasons a reason for unexecutability of the decoloring processing corresponds.

(5). The apparatus of (4), wherein the display control unit causes, on the basis of a determination result in the decolorability determining unit, the display to screen-display the number of sheets determined as decoloring processing unexecutable because of each of the plural reasons for unexecutability of the decoloring processing in association with each of the plural reasons for unexecutability of the decoloring processing.

(6). The apparatus of (4), wherein the display control unit causes the display to screen-display, in association with the reason for decoloring processing unexecutability determined by the decolorability determining unit, a predetermined advice content for improving a state of unexecutability of the decoloring processing based on the reason.

(7). The apparatus of claim (4), wherein the display control unit causes, on the basis of a determination result in the decolorability determining unit, the display to screen-display the number of sheets determined as decoloring processing unexecutable because of each of the plural reasons for unexecutability of the decoloring processing in association with each of the plural reasons for unexecutability of the decoloring processing and causes the display to screen-display a predetermined advice content for improving a state of unexecutability of the decoloring processing due to a reason that the number of sheets determined as decoloring processing unexecutable is the largest.

(8). The apparatus of (1), further including a contribution-ratio calculating unit configured to calculate the number of sheets subjected to the decoloring processing on the basis of the number of sheets determined as decoloring processing unexecutable by the decolorability determining unit and the number of sheets set as the detection targets by the thickness sensor and calculates an environmental load contribution ratio calculated by multiplying the number of sheets subjected to the decoloring processing with a specified coefficient, wherein the display control unit causes the display to screen-display the environmental load contribution ratio calculated by the contribution-ratio calculating unit.

(9). The apparatus of (8), wherein the environmental load contribution ratio is a reduction amount of $CO_2$.

(10). The apparatus of (1), further including:

a number-of-printed-sheets-information acquiring unit configured to acquire information indicating the number of sheets subjected to print processing in an image forming apparatus that can communicate with the decoloring apparatus; and an decoloring-processing-execution-ratio calculating unit configured to calculate an decoloring processing execution ratio that is a ratio of the number of sheets subjected to the decoloring processing, which is calculated on the basis of the number of sheets determined as decoloring processing unexecutable by the decolorability determining unit and the number of sheets set as the detection targets by the thickness sensor, to the number of sheets acquired by the number-of-printed-sheets-information acquiring unit, wherein the display control unit causes the display to screen-display the decoloring processing execution ratio.

(11). The apparatus of (1), wherein the display control unit causes, when the decoloring processing is completed, the display to screen-display a totalization result of information stored in the storing unit indicating a processing result of the decoloring processing executed in a predetermined period in the past.

Further, it is possible to provide a computer program for causing a computer included in the decoloring apparatus to execute the operations explained above. In this embodiment, as an example, the computer program for realizing a function of carrying out the present invention is recorded in advance in a storage area provided in the apparatus. However, the present invention is not limited to this. The same computer program may be downloaded from a network to the apparatus or the same computer program stored in a computer-readable recording medium may be installed in the apparatus. A form of the recording medium may be any form as long as the recording medium can store the computer program and can be read by the computer. Specifically, examples of the recording medium include an internal storage device internally mounted in a computer such as a ROM or a RAM, a portable storage medium such as a CD-ROM, a flexible disk, a DVD disk, a magneto-optical disk, or an IC card, a database that stores a computer program, other computers and databases of the computers, and a transmission medium on a line. A function obtained in advance by installation or download in this way may be realized in cooperation with an OS (operating system) or the like in the apparatus.

The computer program may be an execution module that is dynamically generated partially or entirely.

It goes without saying that it is also possible to cause the ASIC 802 to execute, in terms of a circuit, at least a part of the various kinds of processing realized by causing the processor to execute the computer program in the embodiments.

It goes without saying that it is also possible to adopt a configuration for combining the first to third embodiments in a desired combination and realizing the embodiments according to necessity.

As explained above in detail, with the technique described in this specification, it is possible to provide an interface screen on which information concerning a processing state of decoloring processing in an decoloring apparatus is easily grasped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the sprit of the inventions. The accompanying claims and their equivalents are intended to cover such forms or modifications as would fall within the scope and spirit of the inventions.

What is claimed is:

1. A decoloring apparatus comprising:
a sheet conveying unit configured to convey a sheet;
a decoloring unit configured to decolor a color of an image formed with a decolorable colorant on the sheet conveyed by the sheet conveying unit;
a processing unit configured to determine a number of sheets made reusable by having color thereon successfully erased in the decoloring unit, to calculate an environmental load contribution ratio calculated by multiplying the number of sheets made reusable with a specified coefficient, and to determine a number of sheets on which decoloring by the decoloring unit is impossible; and
a display control unit configured to cause a display unit to display the number of sheets made reusable and the environmental load contribution ratio calculated by the processing unit, and to cause the display unit to display the number of sheets on which decoloring by the decoloring unit is determined to be impossible by the processing unit.

2. The apparatus of claim 1, wherein
the display control unit causes the display unit to display the environmental load contribution ratio by displaying a predetermined image in a predetermined indicator area.

3. The apparatus of claim 2, wherein
the display control unit causes the display unit to display the environmental load contribution ratio based on the quantity of increase and decrease of a predetermined change factor expected to increase and decrease according to CO2 emissions.

4. The apparatus of claim 1, wherein
the display control unit causes the display unit to display the environmental load contribution ratio with a number of trees indicating a contribution to the environment due to the execution of the decoloring processing, the number of trees being zero before the start of the decoloring processing,
the display control unit causing the display to update and display the number of trees on a real time basis with the start of the decoloring processing.

5. The apparatus of claim 1, further comprising:
an identification information acquisition unit configured to acquire identification information of a user who instructs execution of the decoloring processing by the decoloring apparatus; and
a storing unit configured to store the identification information of the user who instructs execution and information indicating the environmental load contribution ratio calculated by the processing unit, in association with each other, wherein
if the identification information acquisition unit acquires the identification information of a user, the display control unit causes the display unit to display a totalization result corresponding to the acquired identification information, the totalization result indicating the environmental load contribution ratio stored in the storing unit in association with the acquired identification information.

6. The apparatus of claim 5, wherein
the storing unit stores an execution day of the decoloring processing and the information indicating the environmental load contribution ratio calculated by the processing unit in association with each other,
the apparatus further comprises an operation input unit configured to receive an operation input of the user, wherein
if the operation input unit receives a display request for the totalization result for a unit period corresponding to one of a plurality of stored execution days, the display control unit causes the display unit to display the totalization result based on the corresponding stored execution day and the associated information stored in the storing unit indicating the environmental load contribution ratio calculated by the processing unit.

7. A controlling apparatus connecting to a decoloring apparatus comprising a decoloring unit configured to decolor a color of an image formed with a decolorable colorant on the sheet and a reading unit configured to read a sheet conveyed and acquire an image, the decoloring apparatus configured to determine whether or not the sheet is reusable based on the image acquired, the controlling apparatus comprising:
a processing unit configured to determine a number of sheets made reusable by having color thereon successfully erased in the decoloring unit, to calculate an environmental load contribution ratio calculated by multiplying the number of sheets made reusable with a specified coefficient, and to determine a number of sheets on which decoloring by the decoloring unit is impossible; and
a display control unit configured to cause a display unit to display the number of sheets made reusable and the environmental load contribution ratio, and to cause the display unit to display the number of sheets on which decoloring by the decoloring unit is determined to be impossible by the processing unit.

8. The apparatus of claim 7, wherein
the display control unit causes the display unit to display the environmental load contribution ratio by displaying a predetermined image in a predetermined indicator area.

9. The apparatus of claim 8, wherein
the display control unit causes the display unit to display the environmental load contribution ratio based on a quantity of increase and decrease of a predetermined change factor expected to increase and decrease according to CO2 emissions.

10. The apparatus of claim 7, wherein
the display control unit causes the display unit to display the environmental load contribution ratio with a number of trees indicating contribution to the environment due to the execution of the decoloring processing, the number of trees being zero before the start of the decoloring processing,
the display control unit causing the display to update and display the number of trees on a real time basis with the start of the decoloring processing.

11. A method for displaying processing information about a sheet which a decoloring apparatus processed, the decoloring apparatus comprising: a decoloring unit configured to decolor a color of an image formed with a decolorable colorant on the sheet; and a reading unit configured to read a sheet conveyed and acquire an image, the method comprising:

determining a number of sheets made reusable by having color thereon successfully erased in the decoloring unit and calculating a environmental load contribution ratio by multiplying the number of sheets made reusable with a specified coefficient;

determining a number of sheets on which decoloring by the decoloring unit is impossible;

causing a display unit to display the number of sheets made reusable and the environmental load contribution ratio; and causing the display unit to display the number of sheets on which decoloring by the decoloring unit is determined to be impossible.

12. The method of claim 11, wherein
causing the display unit to display the environmental load contribution ratio further includes displaying a predetermined image in a predetermined indicator area.

13. The method of claim 12, wherein
the displayed environmental load contribution ratio is based on the quantity of increase and decrease of a predetermined change factor expected to increase and decrease according to CO2 emissions.

14. The method of claim 11, wherein
causing the display unit to display the environmental load contribution ratio with the number of trees indicating a contribution to the environment due to the execution of the decoloring processing, the number of trees being zero before the start of the decoloring processing, and updating and displaying the number of trees on a real time basis with the start of the decoloring processing.

15. A decoloring apparatus comprising:
a sheet conveying means for conveying a sheet;
a decoloring means for decoloring a color of an image formed with a decolorable colorant on the sheet conveyed by the sheet conveying means;
a processing means for determining a number of sheets made reusable by having color thereon successfully erased in by the decoloring means, an environmental load contribution ratio calculated by multiplying the number of sheets made reusable with a specified coefficient, and a number of sheets on which decoloring by the decoloring means is impossible; and
a display control means for causing a display unit to display the number of sheets made reusable and the environmental load contribution ratio calculated by the processing means, and for causing the display unit to display the number of sheets on which decoloring by the decoloring means is determined be impassible processing means.

16. The apparatus of claim 15, wherein
the display control means causes the display unit to display the environmental load contribution ratio by displaying a predetermined image in a predetermined indicator area.

17. The apparatus of claim 16, wherein
the display control means causes the display unit to display the environmental load contribution ratio based on a quantity of increase and decrease of a predetermined change factor expected to increase and decrease according to CO2 emissions.

18. The apparatus of claim 15, wherein
the display control means causes the display unit to display the environmental load contribution ratio with a number of trees indicating a contribution to the environment due to the execution of the decoloring processing by the decoloring means, the number of trees being zero before the start of the decoloring processing,
the display control means causing the display to update and display the number of trees on a real time basis with the start of the decoloring processing.

19. The apparatus of claim 15, further comprising:
an identification information acquisition means for acquiring identification information of a user who instructs execution of the decoloring processing by the decoloring means; and
a storing means for storing the identification information of the user who instructs execution of the decoloring processing and information indicating the environmental load contribution ratio calculated by the processing means, in association with each other, wherein
if the identification information acquisition means acquires the identification information of a user, the display control means causes the display unit to display a totalization result corresponding to the acquired identification information, the totalization result indicating the environmental load contribution ratio stored in the storing means in association with the acquired identification information.

20. The apparatus of claim 19, wherein
the storing means stores an execution day of the decoloring processing and the information indicating the environmental load contribution ratio calculated by the processing means, in association with each other,
the apparatus further comprises an operation input means for receiving an operation input of the user, wherein
if the operation input means receives a display request for the totalization result for a unit period corresponding to one of a plurality of stored execution days, the display control means causes the display unit to display the totalization result based on the corresponding stored execution day and the associated information stored in the storing means indicating the environmental load contribution ratio calculated by the processing means.

* * * * *